(12) United States Patent
Moon et al.

(10) Patent No.: US 9,549,143 B2
(45) Date of Patent: Jan. 17, 2017

(54) METHOD AND MOBILE TERMINAL FOR DISPLAYING INFORMATION, METHOD AND DISPLAY DEVICE FOR PROVIDING INFORMATION, AND METHOD AND MOBILE TERMINAL FOR GENERATING CONTROL SIGNAL

(71) Applicant: SAMSUNG ELECTRONICS CO., LTD., Suwon-si (KR)

(72) Inventors: Bo-seok Moon, Gunpo-si (KR); Won-jong Choi, Seo-gu (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 443 days.

(21) Appl. No.: 13/950,507

(22) Filed: Jul. 25, 2013

(65) Prior Publication Data

US 2014/0028921 A1 Jan. 30, 2014

(30) Foreign Application Priority Data

Jul. 25, 2012 (KR) .................. 10-2012-0081434

(51) Int. Cl.
*H04N 5/44* (2011.01)
*H04N 21/41* (2011.01)
(Continued)

(52) U.S. Cl.
CPC ........ *H04N 5/4403* (2013.01); *H04N 21/4126* (2013.01); *H04N 21/4722* (2013.01); *H04N 21/4725* (2013.01); *H04N 21/4728* (2013.01)

(58) Field of Classification Search
CPC .............................. G06F 3/048; G06F 3/0484
See application file for complete search history.

(56) References Cited

U.S. PATENT DOCUMENTS 8,112,371 B1 * 2/2012 Tu ........................ A63F 13/06
706/14
2002/0162120 A1 10/2002 Mitchell
(Continued)

FOREIGN PATENT DOCUMENTS

EP          1853061 A1   11/2007
KR   10-2011-0016571 A    2/2011
(Continued)

OTHER PUBLICATIONS

Communication dated Mar. 5, 2015 issued by the European Patent Office in counterpart European Patent Application No. 13178017.3.
(Continued)

*Primary Examiner* — Andrea Leggett
(74) *Attorney, Agent, or Firm* — Sughrue Mion, PLLC

(57) ABSTRACT

A method in which a mobile terminal displays information is provided. The method includes: transmitting, to an external display device, a first signal for selecting an object displayed on the external display device based on a first input of a user through the mobile terminal; transmitting, to the external display device, a second signal for requesting additional information corresponding to the selected object based on a second input of the user through the mobile terminal; and displaying, on a screen of the mobile terminal, the additional information received from the external display device.

20 Claims, 17 Drawing Sheets

(51) Int. Cl.
*H04N 21/4722* (2011.01)
*H04N 21/4725* (2011.01)
*H04N 21/4728* (2011.01)

(56) References Cited

U.S. PATENT DOCUMENTS

| | | | |
|---|---|---|---|
| 2003/0076344 A1 | 4/2003 | Chatani et al. | |
| 2011/0154396 A1 | 6/2011 | Kim et al. | |
| 2012/0017237 A1* | 1/2012 | Pan | H04N 5/44582 725/32 |
| 2012/0133645 A1 | 5/2012 | Jung et al. | |
| 2012/0137329 A1 | 5/2012 | Patil et al. | |
| 2013/0177891 A1* | 7/2013 | Hammerschmidt | G09B 5/06 434/309 |

FOREIGN PATENT DOCUMENTS

| | | |
|---|---|---|
| KR | 10-2011-0070589 A | 6/2011 |
| KR | 10-2011-0088952 A | 8/2011 |
| TW | 201219871 A1 | 5/2012 |
| TW | 201224993 A1 | 6/2012 |
| WO | 2011008387 A2 | 1/2011 |
| WO | 2011084950 A2 | 7/2011 |

OTHER PUBLICATIONS

Communication, dated Dec. 11, 2013, issued by the European Patent Office, in counterpart Application No. 13178017.3.
Search Report, dated Oct. 24, 2013, issued by the International Searching Authority, in counterpart Application No. PCT/KR2013/006112.
Written Opinion, dated Oct. 24, 2013, issued by the International Searching Authority, in counterpart Application No. PCT/KR2013/006112.
Communication issued Aug. 29, 2016, issued by the Intellectual Property Office of Taiwan in counterpart Taiwanese Patent Application No. 102125656.

* cited by examiner

FIG. 5
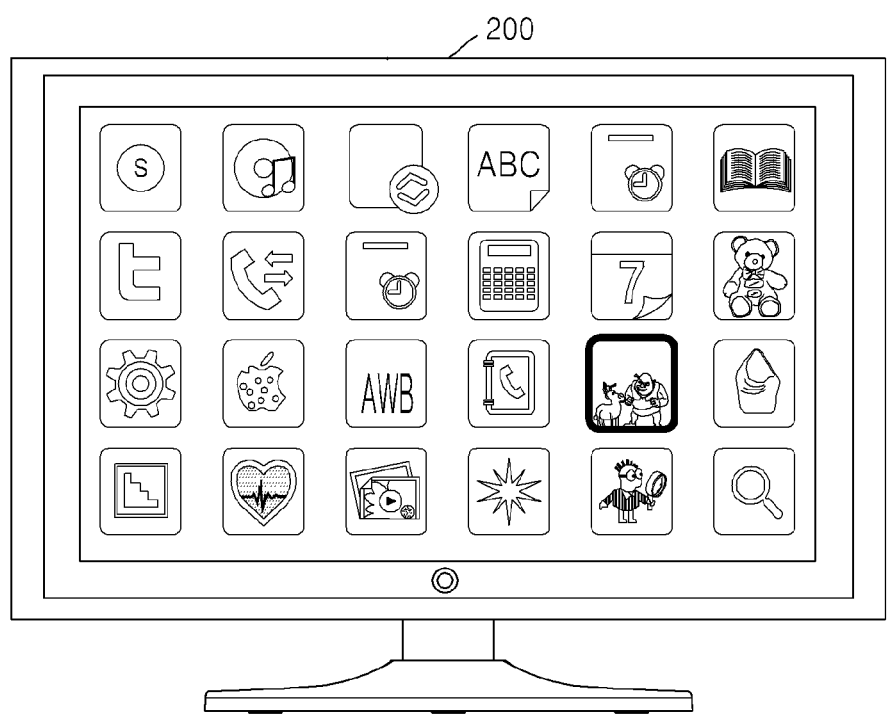
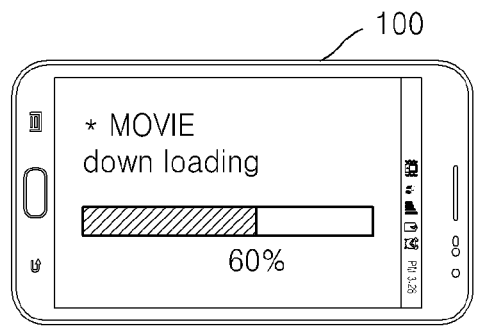

FIG. 6
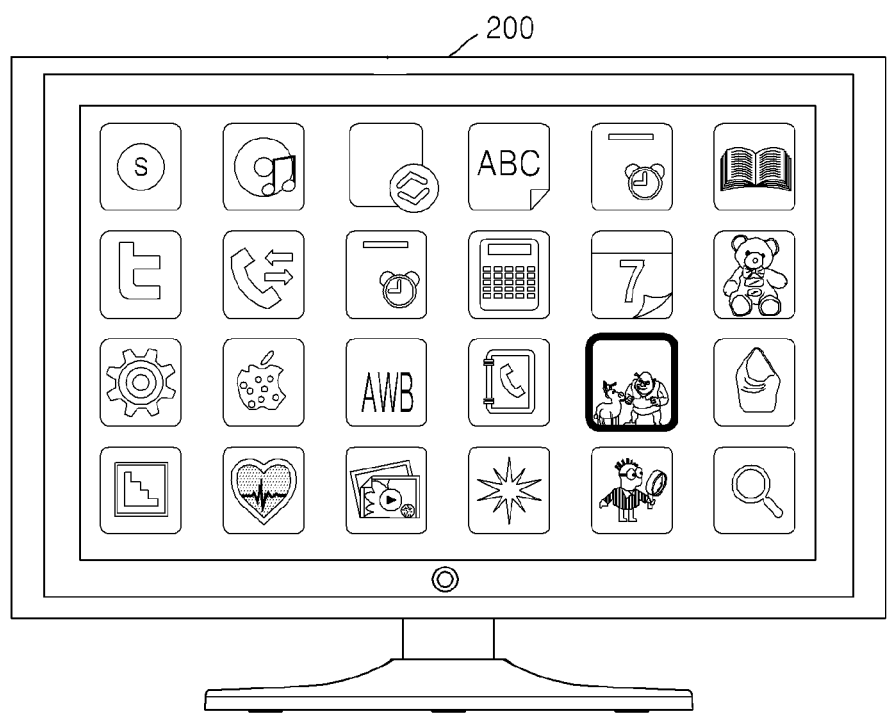
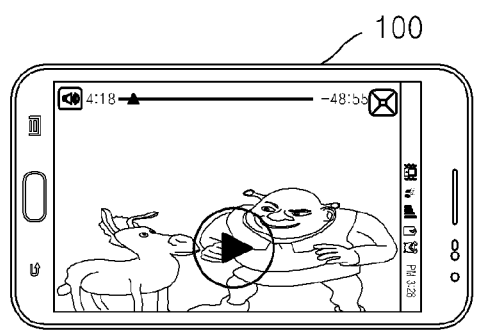

METHOD AND MOBILE TERMINAL FOR DISPLAYING INFORMATION, METHOD AND DISPLAY DEVICE FOR PROVIDING INFORMATION, AND METHOD AND MOBILE TERMINAL FOR GENERATING CONTROL SIGNAL

CROSS-REFERENCE TO RELATED PATENT APPLICATION

This application claims priority from Korean Patent Application No. 10-2012-0081434, filed on Jul. 25, 2012, in the Korean Intellectual Property Office, the disclosure of which is incorporated herein in its entirety by reference.

BACKGROUND

1. Field

Exemplary embodiments relate to a method and mobile terminal for displaying information by selecting an object displayed on an external display device based on an input of the mobile terminal and obtaining and displaying additional information corresponding to the selected object, a method and display device for providing information by selecting an object based on an input of a mobile terminal and providing additional information regarding the selected object to the mobile terminal, and a method and mobile terminal for generating a control signal by changing a received user input to the control signal based on an operating mode of the mobile terminal.

2. Description of the Related Art

A smart television (TV) is a multifunctional TV capable of utilizing various functions such as web surfing, video on demand (VOD) watching, a social networking service (SNS), a game, etc. by combining a TV and an Internet access function and installing various applications.

One characteristic of the smart TV is that a user and the TV can transmit and receive information from each other. This is a difference between the smart TV and an existing TV that merely transfers information unilaterally. Thus, the smart TV is also referred to as an interactive TV.

However, it is very inconvenient for the user to use the various functions of the smart TV by using a standard remote controller. In particular, when the user browses or downloads contents, the user needs to manipulate the remote controller through several steps.

Therefore, a control device or system for allowing the user to easily control the smart TV is needed.

SUMMARY

Exemplary embodiments provide a method and mobile terminal for displaying information by selecting an object displayed on an external display device based on an input of the mobile terminal and obtaining and displaying additional information corresponding to the selected object.

Exemplary embodiments also provide a method and display device for providing information by selecting an object based on an input of a mobile terminal and providing additional information regarding the selected object to the mobile terminal.

Exemplary embodiments also provide a method and mobile terminal for generating a control signal by changing a received user input to the control signal based on an operating mode of the mobile terminal.

According to an aspect of an exemplary embodiment, there is provided a method in which a mobile terminal displays information, the method including: transmitting a first signal for selecting an object displayed on an external display device to the external display device based on a first input of a user through the mobile terminal; transmitting a second signal for requesting additional information corresponding to the selected object to the external display device based on a second input of the user through the mobile terminal; and displaying, on a screen of the mobile terminal, the additional information received from the external display device.

The transmitting of the first signal for selecting the object may include: converting the signal for selecting the object according to a control protocol of the external display device.

The transmitting of the first signal for selecting the object may include: transmitting a signal for controlling a movement of a selection region for selecting the object displayed on the external display device.

The transmitting of the signal for controlling the movement of the selection region may include: transmitting a signal for controlling at least one of a movement direction of the selection region, a movement speed of the selection region, and a number of objects displayed on a screen of the external display device based on the first input.

The transmitting of the first signal for selecting the object may include: displaying thumbnail information of contents corresponding to the object on the screen of the mobile terminal.

The thumbnail information may include at least one of an image of the contents corresponding to the object, a title of the contents, and a type of the contents.

The transmitting of the first signal for selecting the object may include: displaying a movement direction of the mobile terminal on the screen according to the first input.

The first input and the second input may include at least one of a motion input, a key input, a touch input, a bending input, and a voice input.

The first input may include a three-dimensional (3D) motion input for moving the mobile terminal in a 3D direction, wherein the second input includes a rotational motion input for rotating the mobile terminal by more than a predetermined angle.

The transmitting of the second signal for requesting additional information may include: receiving the additional information from the display device.

The transmitting of the second signal for requesting additional information may include: receiving link information of the additional information from the external display device based on the second input; and receiving the additional information from a server based on the received link information.

The transmitting of the first signal for selecting the object to the display device may include: requesting control authorization from the external display device; and receiving a control authorization acceptance message from the external display device.

The contents may include at least one of a still image, a moving image, an application, music, a web page, and an electronic program guide (EPG).

The additional information may include at least one of preview information, prelistening information, application information, user review information, update information, newspaper article information, goods information, movie information, game information, advertisement image information, and album information.

The method may further include: controlling the additional information displayed on the screen of the mobile terminal based on a third input of the user through the mobile terminal.

The controlling of the additional information may include: controlling at least one of displaying of the additional information, playing of the additional information, and changing to previous additional information or next additional information based on the third input of the user through the mobile terminal.

The method may further include: obtaining contents corresponding to the additional information displayed on the screen of the mobile terminal.

According to an aspect of another exemplary embodiment, there is provided a method in which a display device provides information to a mobile terminal, the method including: selecting an object displayed on the display device by receiving a first input of a user through the mobile terminal; and transmitting additional information corresponding to the selected object to the mobile terminal by receiving a second input of the user through the mobile terminal.

The transmitting may include: extracting the additional information from contents corresponding to the selected object.

The selecting of the object may include: receiving a control signal for controlling a movement of a selection region for selecting the object from the mobile terminal; and moving the selection region according to the control signal.

The selecting of the object may include: converting the received first input to a control signal for controlling a movement of a selection region according to a control protocol of the display device.

The receiving may include: receiving the control signal for controlling the movement of the selection region from each of a plurality of mobile terminals.

The method may further include: sensing at least one of the first input of the user through the mobile terminal and the second input of the user through the mobile terminal.

The selecting of the object may include: controlling at least one of a movement direction of the selection region, a movement speed of the selection region, and a number of objects displayed on a screen based on the first input of the user through the mobile terminal.

The selecting of the object may include: transmitting thumbnail information of contents corresponding to the object to the mobile terminal.

The transmitting of the additional information to the mobile terminal may include: transmitting link information of the additional information to the mobile terminal.

The terminal may further include: receiving a request for transmission of contents corresponding to the selected object from the mobile terminal; and transmitting the contents corresponding to the selected object to the mobile terminal.

According to an aspect of another exemplary embodiment, there is provided a mobile terminal including: a communication unit which is configured to transmit a signal for selecting an object displayed on an external display device to the external display device based on a first input of a user through the mobile terminal; an additional information obtaining unit which is configured to transmit a signal for requesting additional information corresponding to the selected object to the external display device based on a second input of the user through the mobile terminal; a display which is configured to display the additional information received from the external display device; and a controller which is configured to control the communication unit, the additional information obtaining unit, and the display unit.

The controller may convert the signal for selecting the object according to a control protocol of the external display device.

The communication unit may transmit a signal for controlling a movement of a selection region for selecting the object displayed on the external display device.

The communication unit may transmit a signal for controlling at least one of a movement direction of the selection region, a movement speed of the selection region, and the number of objects displayed on a screen of the external display device based on the first input.

The display may display thumbnail information of contents corresponding to the object on a screen of the mobile terminal.

The additional information obtaining unit may receive the additional information from the external display device.

The communication unit may receive link information of the additional information from the external display device based on the second input, and wherein the additional information obtaining unit receives the additional information from a server based on the received link information.

The controller may control the additional information displayed on the mobile terminal based on a third input of the user through the mobile terminal.

The mobile terminal may further include: a contents obtaining unit which is configured to obtain content corresponding to the additional information displayed on the mobile terminal.

According to an aspect of an exemplary embodiment, there is provided a display device including: a selection unit which is configured to select an object displayed on the display device based on a first input of a user through a mobile terminal; a communication unit which is configured to transmit additional information corresponding to the selected object to the mobile terminal by receiving a second input of the user through the mobile terminal, and a controller which is configured to control the selection unit and the communication unit.

The controller may extract the additional information from contents corresponding to the selected object.

The selection unit may receive a control signal for controlling a movement of a selection region for selecting the object from the mobile terminal and move the selection region according to the received control signal.

The controller may convert the received first input to a control signal for controlling a movement of a selection region according to a control protocol of the display device.

The display device may further include: a sensor which is configured to sense at least one of the first input of the user through the mobile terminal and the second input of the user through the mobile terminal.

The controller may control at least one of a movement direction of the selection region, a movement speed of the selection region, and a number of objects displayed on a screen based on the first input of the user through the mobile terminal.

The communication unit may transmit link information of the additional information to the mobile terminal.

The communication unit may receive a request for transmission of contents corresponding to the selected object from the mobile terminal and transmit the contents corresponding to the selected object to the mobile terminal.

According to an aspect of another exemplary embodiment, there is provided a method in which a mobile terminal generates a control signal, the method including: receiving a user input; determining an operation mode of the mobile terminal; and in response to determining the operation mode is a first mode, generating a first control signal for controlling an external display device based on the user input, and, in response to determining the operation mode is a second mode, generating a second control signal for controlling contents displayed on the mobile terminal based on the user input.

The contents may include contents corresponding to an object selected from the external display device or additional information corresponding to the object based on the first control signal.

The user input may include at least one of a motion input, a key input, a touch input, a bending input, and a voice input.

The determining may include: determining the operation mode of the mobile terminal as the first mode in a case where the mobile terminal is in a vertical mode, and, determining the operation mode of the mobile terminal as the second mode in a case where the mobile terminal is in a horizontal mode.

The determining may include: determining the operation mode of the mobile terminal based on information displayed on a screen of the mobile terminal.

The determining may include: in response to determining the information displayed on the screen of the mobile terminal is thumbnail information of contents corresponding to the object displayed on the external display device or movement direction information of the mobile terminal, determining the operation mode of the mobile terminal as the first mode, and, in response to determining the information displayed on the screen of the mobile terminal is the contents corresponding to the object displayed on the external display device or additional information corresponding to the object, determining the operation mode of the mobile terminal as the second mode.

The generating of the first control signal may include: converting the first control signal according to a control protocol of the external display device.

The first mode may be a mode in which the object of the external display device is selected, and the second mode is a mode in which additional information corresponding to the selected object is displayed on the mobile terminal.

The first control signal may include a signal for controlling a movement of a selection region for selecting the object of the external display device, and the second control signal may include a signal for controlling at least one of playing of the contents, editing of the contents, and transmission of the contents.

The method may further include: receiving a first rotational motion input for rotating the mobile terminal in a first direction by a predetermined angle; converting the operation mode from the first mode to the second mode based on the first rotational motion input; receiving a second rotational motion input for rotating the mobile terminal in a second direction by the predetermined angle; and converting the operation mode from the second mode to the first mode based on the second rotational motion input.

According to an aspect of another exemplary embodiment, there is provided a mobile terminal including: a user input which is configured to receive a user input; an operation mode determining unit which is configured to determine an operation mode of the mobile terminal; and a controller which is configured, in response to the operation mode determining unit determining that the operation mode is a first mode, generate a first control signal for controlling an external display device based on the user input, and, in response to the operation mode determining unit determining that the operation mode is a second mode, generate a second control signal for controlling contents displayed on the mobile terminal based on the user input.

The user input may receive a first rotational motion input for rotating the mobile terminal in a first direction by a predetermined angle and a second rotational motion input for rotating the mobile terminal in a second direction by the predetermined angle, and wherein the controller converts the operation mode from the first mode to the second mode based on the first rotational motion input and the operation mode from the second mode to the first mode based on the second rotational motion input.

According to an aspect of another exemplary embodiment, a method of displaying information of an external display device on a mobile terminal displays is provided. The method includes: receiving a user input into the mobile terminal about an object displayed on the external display device; transmitting a first signal to the external display device to select the object displayed on an external display device; receiving a second user input into the mobile terminal about additional information corresponding to the object displayed on the external display device; transmitting a second signal to the external display device to request additional information corresponding to the selected object; and displaying, on a screen of the mobile terminal, the additional information received from the external display device.

The transmitting the first signal may include converting the first signal to a control protocol of the external display device.

The transmitting the first signal may include requesting control authorization from the external display device and receiving a control authorization acceptance message from the external display device.

BRIEF DESCRIPTION OF THE DRAWINGS

The above and other features and advantages will become more apparent by describing in detail exemplary embodiments with reference to the attached drawings in which:

FIG. 5 is a view of a screen on which contents are obtained, according to an exemplary embodiment;

FIG. 6 is a view of a screen on which an object is displayed or reproduced, according to an exemplary embodiment;

DETAILED DESCRIPTION OF THE EXEMPLARY EMBODIMENTS

Figure 1:
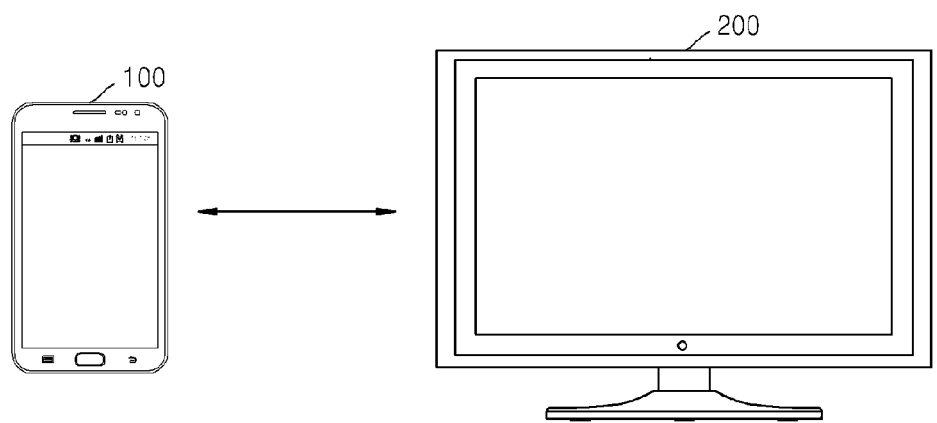
FIG. 1 is a view for explaining an information providing system according to an exemplary embodiment.

First, the terms used herein will be briefly described, and then the exemplary embodiments will be described in detail.

Although the terms used herein are general terms that are widely used at present in consideration of the functions of the exemplary embodiments, they may vary according to the intention of one of ordinary skill in the art, a precedent, the appearance of new technology, or the like. In addition, in a particular case, the applicant may select the terms arbitrarily. In this case, the meanings of the terms will be described in detail in the detailed description of the exemplary embodiments. Thus, the terms used in the detailed description should not be only names of the terms but should be defined based on their meanings and contents in relation to the exemplary embodiments.

When a unit "comprises" an element in the entire specification, the unit does not exclude another element but may further comprise another element unless the context clearly indicates otherwise. In addition, terms such as " . . . unit", "module", and the like used herein indicate a unit for performing at least one function or operation and may be implemented by hardware or software or a combination thereof.

Throughout the specification, an "object" refers to a target that may be selected by a user from a display device. Examples of the object include, but are not limited to, an icon, a link, a picture, a text, an index item, etc.

In addition, "additional information" refers to information regarding contents corresponding to an object, and may have various forms according to types of contents. Examples of the additional information may include, but are not limited to, preview information, prelistening information, application information, user review information, advertisement image information, update information, newspaper article information, goods information, movie information, game information, album information, etc.

In the present specification, "contents" may be displayed, reproduced, or stored in a mobile terminal, and may include, for example, still image contents (for example, a photo, a picture, etc.), text contents (for example, an electronic book (a poem and a novel), a letter, a business file, a web page, an electronic program guide (EPG), etc.), moving image contents (for example, a personal image, a movie, music video, a YouTube video, a TV program image, etc.), music contents (for example, music, a music performance, a radio broadcast, etc.), an application (a widget, a game, etc.)

The exemplary embodiments will now be described more fully with reference to the accompanying drawings. The exemplary embodiments may, however, be embodied in many different forms and should not be construed as being limited to the embodiments set forth herein; rather, these embodiments are provided so that this disclosure will be thorough and complete, and will fully convey the inventive concept to those of ordinary skill in the art. For clarity, in the drawings, irrelevant portions with respect to the description are omitted, and similar reference numbers are added to similar portions throughout the entire specification.

As used herein, the term "and/or" includes any and all combinations of one or more of the associated listed items. Expressions such as "at least one of," when preceding a list of elements, modify the entire list of elements and do not modify the individual elements of the list.

FIG. 1 is a view for explaining an information providing system according to an exemplary embodiment.

Referring to FIG. 1, the information providing system according to an exemplary embodiment may include a mobile terminal 100 and an external display device 200.

The mobile terminal 100 is a device that obtains contents from the outside and displays, reproduces, or stores the obtained contents. The mobile terminal 100 may be implemented in various ways. For example, the mobile terminal 100 described in the present specification may include a cellular phone, a smart phone, a laptop computer, a tablet personal computer (PC), an e-book terminal, a personal digital assistant (PDA), a portable multimedia player (PMP), a navigation system, etc.

The display device 200 is a device that may be of various types including a display panel. For example, the display device 200 described in the present specification may include a smart television (TV), an Internet protocol TV (IPTV), a digital TV (DTV), a computer, a laptop computer, an e-book terminal, a tablet PC, a digital broadcasting terminal, a consumer electronics (CE) device (for example, a refrigerator or an air conditioner having the display panel), etc.

The display device 200 according to an exemplary embodiment may display an object list. The object list may include identification information regarding at least one piece of contents. Examples of the identification information may include a title of contents, an image and icon indicating contents, etc.

Figure 2:
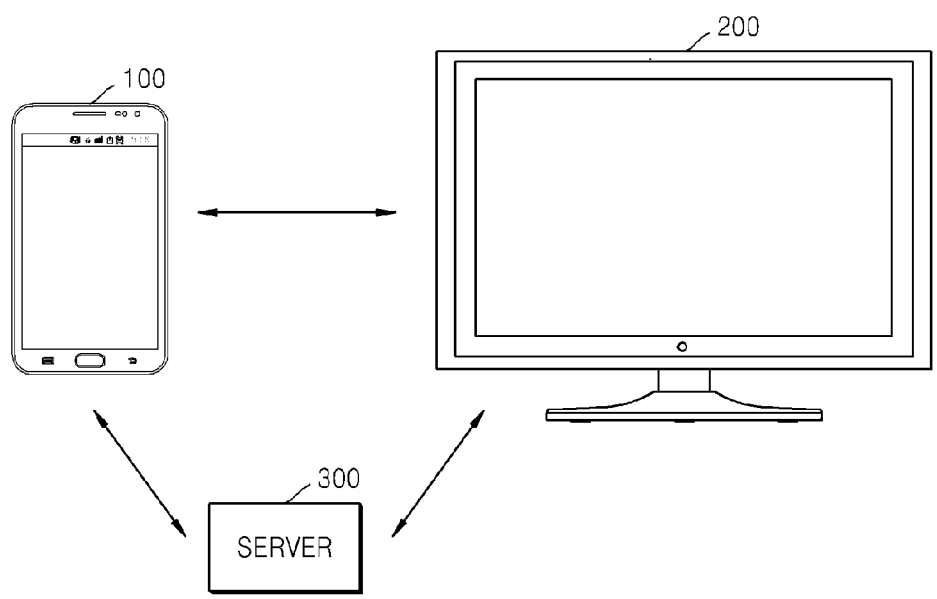
FIG. 2 is a view for explaining an information providing system according to another exemplary embodiment.

FIG. 2 is a view for explaining an information providing system according to another exemplary embodiment.

Referring to FIG. 2, the information providing system according to another exemplary embodiment may include the mobile terminal 100, the display apparatus 200, and a server 300.

The mobile terminal 100 and the display apparatus 200 are the same as described with reference to FIG. 1, and thus descriptions thereof are omitted.

The server 300 may communicate with the mobile terminal 100 or the display apparatus 200. According to an exemplary embodiment, the server 300 may receive a contents providing request from the mobile terminal 100 or the display device 200. In this case, the server 300 may provide contents to the mobile terminal 100 or the display device 200. The contents provided by the server 300 may be contents corresponding to an object selected by the display device 200 or additional information corresponding to the object.

For example, in a case where the display device 200 selects an object relating to movie contents, the server 300 may provide the movie contents or preview video of the movie contents to the mobile terminal 100 or the display device 200.

An example in which the mobile terminal 100 selects an object displayed on an external display device based on a user input and obtains and displays additional information corresponding to the selected object will now be described in brief with reference to FIGS. 3 through 6.

Figure 3A:
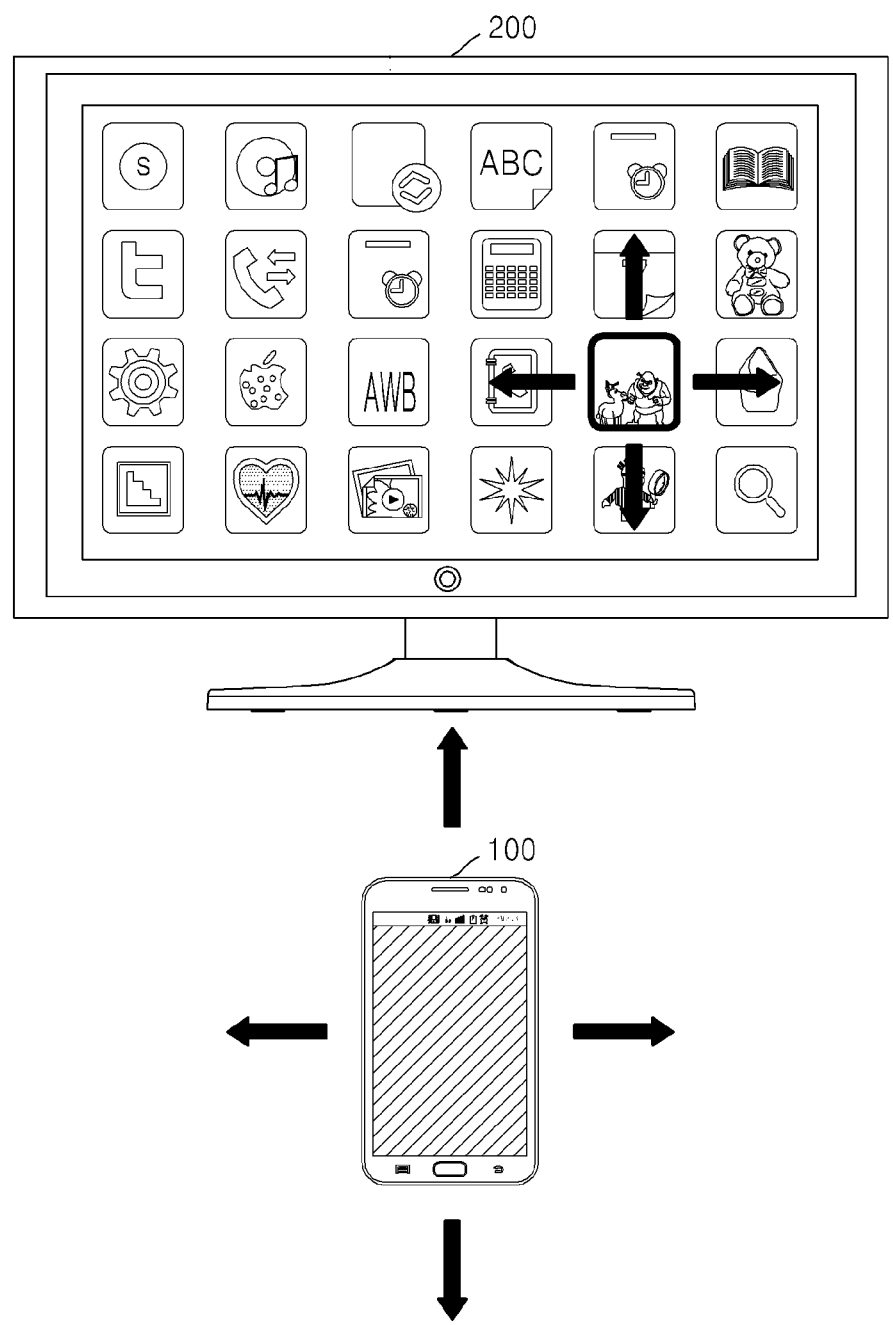
FIGS. 3A through 3C are views of screens on which a mobile terminal selects an object of an external display device, according to an exemplary embodiment.
Figure 3B:
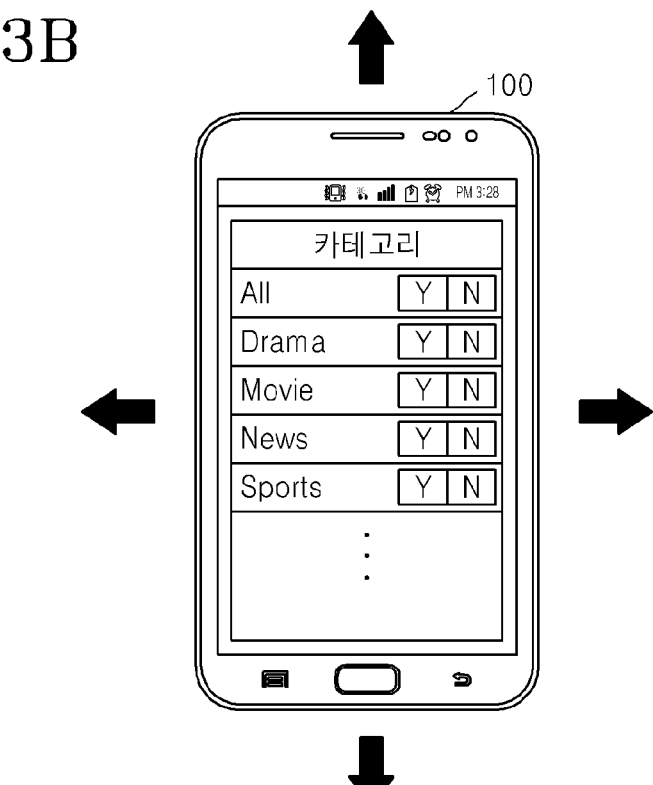
Figure 3C:
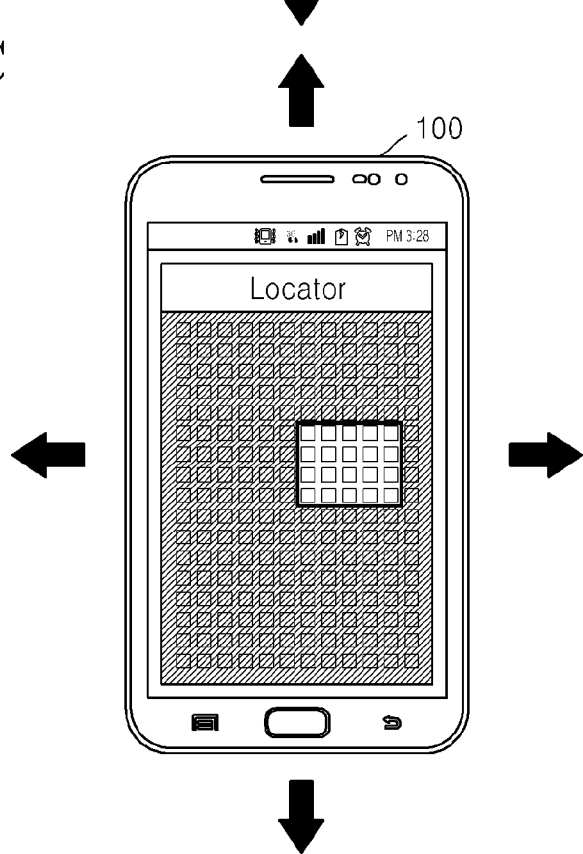
Figure 4:
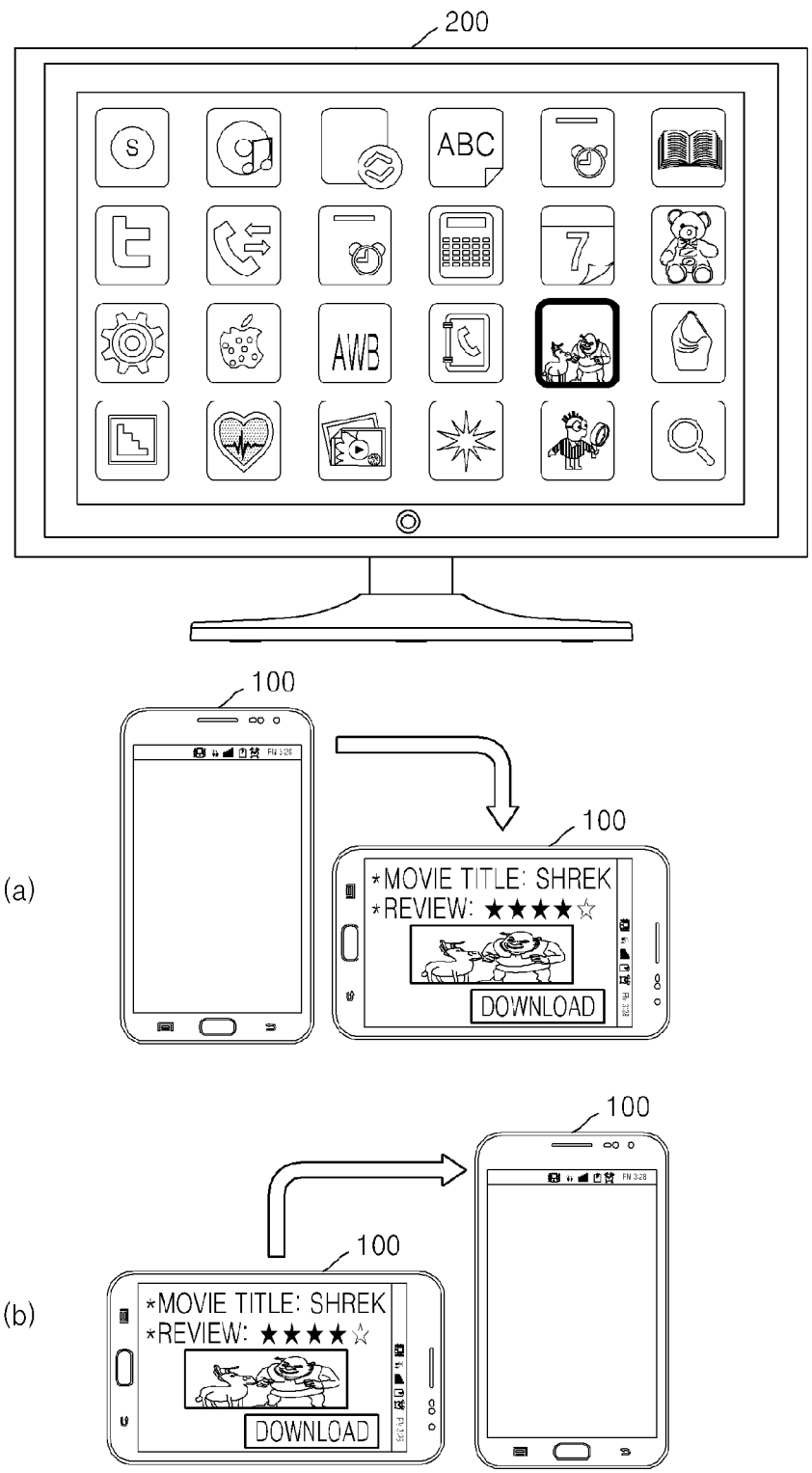
FIGS. 4A and 4B are views of screens on which a mobile terminal obtains additional information, according to an exemplary embodiment.

FIGS. 3A through 3C are views of screens on which the mobile terminal 100 selects an object of the external display device 200, according to an exemplary embodiment.

Referring to FIG. 3A, the display device 200 may display a plurality of objects indicating a plurality of pieces of contents. In this case, a user may use the mobile terminal 100 to select at least one of the plurality of objects displayed on the display device 200.

For example, the user may move the mobile terminal 100 up and down and left and right (a first input) to select at least one of the plurality of objects displayed on the display device 200. In this regard, the display device 200 may display a location of a selection region (for example, a cursor and a pointer) corresponding to a movement of the mobile terminal 100 on a screen.

Although a motion input is exemplarily used as the first input for selecting an object in FIG. 3A, the first input is not limited to the motion input. The first input may be a bending input, a key input, a voice input, and a touch input in addition to the motion input.

According to an exemplary embodiment, the mobile terminal 100 may turn its screen off or may blacken its screen when selecting an object displayed on a screen of the display device 200 in such a way that users eyes are not distracted.

According to another exemplary embodiment, the mobile terminal 100 may display thumbnail information such as an icon, an image, a title, etc. of contents relating to an object in which the selection region is disposed or a movement direction of the mobile terminal 100 as an arrow, etc. on the display device 200.

Referring to FIG. 3B, the mobile terminal 100 may display a selection window (or a graphical user interface (GUI)) for selecting a category (for example, drama, movie, sports, etc.) of contents. In this regard, the mobile terminal 100 may receive a selection of at least one category from the user. The mobile terminal 100 may transmit information regarding the selected category to the display device 200. In this case, the display device 200 may filter and display an object regarding contents corresponding to the category selected by the user.

Referring to FIG. 3C, the mobile terminal 100 may output a map or a GUI indicating objects displayed on the display device 200 from among all the objects.

FIGS. 4A and 4B are views of screens on which the mobile terminal 100 obtains additional information, according to an exemplary embodiment.

Referring to FIG. 4A, a user may move the mobile terminal 100, select an object of the display device 200, then rotate the mobile terminal 100, and request additional information corresponding to the selected object from the display device 200.

In this case, the display device 200 may transmit the additional information corresponding to the selected object or link information (for example, a uniform resource identifier (URI)) of the additional information to the mobile terminal 100. In this regard, the mobile terminal 100 may display the obtained additional information on a screen.

For example, as shown in FIG. 4A, in a case where the user moves the mobile terminal 100, selects an object illustrating Shrek, and converts a vertical mode of the mobile terminal 100 into a horizontal mode, the mobile terminal 100 may obtain and display additional information (for example, Movie Title: Shrek, Review: ★★★★☆, Representative Image, and Advertisement Moving Image) relating to Shrek.

According to an exemplary embodiment, referring to FIG. 4B, if the user wishes to select a new object, the user may select the object of the display device 200 again by converting the horizontal mode of the mobile terminal 100 into the vertical mode.

Although a motion input is that an object is selected and then is that the mobile terminal 100 receives and displays additional information corresponding to the object in FIGS. 3A through 4B as a rotation input, an exemplary embodiment is not limited thereto. That is, according to an exemplary embodiment, the mobile terminal 100 may receive and display additional information regarding contents relating to an object in which a selection region is disposed from the display device 200 while selecting an object of the display device 200 as the motion input. According to an exemplary embodiment, a communication network over which the mobile terminal 100 transmits a signal for selecting an object to the display device 200 and a communication network over which the mobile terminal 100 receives additional information from the display device 200 may be different from each other. For example, the mobile terminal 100 may transmit the signal for selecting the object to the display device 200 via Bluetooth communication and then receive additional information corresponding to the selected object from the display device 200 via Wi-Fi communication.

FIG. 5 is a view of a screen on which contents are obtained, according to an exemplary embodiment.

A user may confirm additional information regarding contents corresponding to an object obtained from the display device 200 and then request the corresponding contents from the display device 200 or the server 300. For example, the user may confirm additional information (user review, etc.) regarding movie Shrek through the display device 200 and then request and download movie contents Shrek from the display device 200 or the server 300.

FIG. 6 is a view of a screen on which an object is displayed or reproduced, according to an exemplary embodiment.

Referring to FIG. 6, according to an exemplary embodiment, the mobile terminal 100 may display or reproduce contents downloaded from the display device 200 or the server 300.

According to another exemplary embodiment, the mobile terminal 100 may receive and reproduce contents by streaming the contents.

A method in which the mobile terminal 100 retrieves and/or displays information based on a user input will now be described in detail below.

A method of displaying information according to an exemplary embodiment may be implemented through a predetermined application. That is, the mobile terminal 100 may drive an application for providing the method of displaying information according to an exemplary embodiment. The mobile terminal 100 may drive an application based on the user input or automatically.

The application driven by the mobile terminal 100 may be an application only for performing a process of controlling the display device 200 or providing various services. For example, the application may be an application for providing a remote control service, a messenger service, a social network service (SNS), a multimedia contents play service, etc.

It is assumed that the method in which the mobile terminal 100 displays information described with reference to FIGS. 7 through 12 may be performed through a predetermined application.

Figure 7:
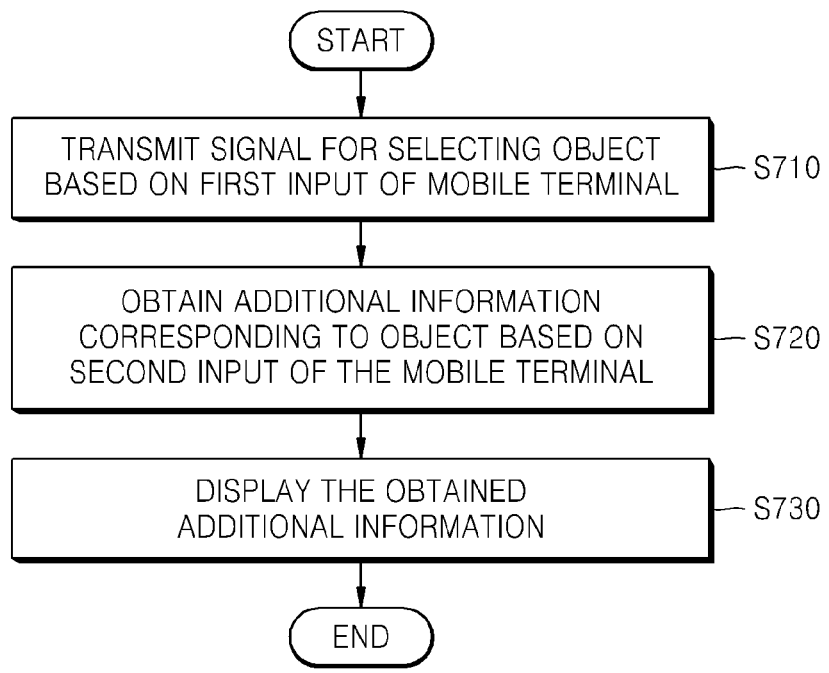
FIG. 7 is a flowchart illustrating a method in which a mobile terminal displays information, according to an exemplary embodiment.

FIG. 7 is a flowchart illustrating a method in which the mobile terminal 100 displays information, according to an exemplary embodiment. Referring to FIG. 7, the method in which the mobile terminal 100 displays information according to an exemplary embodiment includes operations sequentially performed by the mobile terminal 100 of FIG. 14 that will be described later. Thus, although omitted below, the above descriptions regarding the mobile terminal 100 of FIG. 14 will also apply to the method of FIG. 7 in which the mobile terminal 100 displays information.

In operation S710, the mobile terminal 100 may transmit a signal for selecting an object of the external display device 200 to the display device 200 based on a first input. In a case where the first input is received, the mobile terminal 100 may generate the signal for selecting the object of the display device 200 based on the first input.

According to an exemplary embodiment, the mobile terminal 100 may convert the signal for selecting the object according to a control protocol of the display device 200. That is, the mobile terminal 100 may obtain identification information (for example, a device type, a device ID, a device serial number, etc.) of the display device 200 and convert the first input received from a user to a control command recognizable by the display device 200 based on the identification information of the display device 200.

The signal for selecting the object according to an exemplary embodiment may include a signal for controlling a movement of a selection region in which the object is selected. That is, in a case where the mobile terminal 100 detects a movement that is more than a threshold value, the mobile terminal 100 may generate the signal for controlling the movement of the selection region of the display device 200 based on information regarding the detected movement.

For example, in a case where a gyro sensor value is smaller than the threshold value, the mobile terminal 100 may determine that the mobile terminal 100 does not move, may not generate the signal for controlling the movement of the selection region, and, may generate a control signal for moving the selection region by one space every time the gyro sensor value changes by a predetermined value (for example, 10 deg/sec) greater than the threshold value.

The signal for selecting the object according to another exemplary embodiment may include information (for example, movement location information of the mobile terminal 100) regarding the first input. That is, the mobile terminal 100 may directly generate and transmit the signal for controlling the movement of the selection region to the display device 200 or may transmit the information (for example, movement location information of the mobile terminal 100) regarding the first input to the display device 200.

In a case where the information (for example, movement location information of the mobile terminal 100) regarding the first input is transmitted to the display device 200, the display device 200 may convert the first input to the signal for controlling the movement of the selection region according to the control protocol of the display device 200.

For example, in a case where the gyro sensor value smaller than the threshold value is received, the mobile terminal 100 may determine that the mobile terminal 100 does not move and may not generate the signal for controlling the movement of the selection region. The mobile terminal 100 may generate the control signal for moving the selection region by one space every time a predetermined gyro sensor value (for example, 10 deg/sec) that is greater than the threshold value is received.

Before generating the control signal, the mobile terminal 100 may be authenticated to authorize the display device 200 by the display device 200. For example, the mobile terminal 100 may request control authorization from the display device 200. In this regard, the mobile terminal 100 may request the control authorization by transmitting the identification information of the mobile terminal 100 to the display device 200. The identification information of the mobile terminal 100 is unique information for identifying the mobile terminal 100, and may include, for example, a device ID, a unique serial number, a media access control (MAC) address, an international mobile equipment identity (IMEI), etc.

The display device 200 may authenticate the control authorization of the mobile terminal 100 based on the identification information of the mobile terminal 100. In a case where authentication is successful, the display device 200 may transmit a control authorization acceptance message to the mobile terminal 100. In this case, the mobile terminal 100 may control the display device 200.

When transmitting the control authorization acceptance message, the display device 200 may register the identification information of the mobile terminal 100 in a storage unit. Thus, although the mobile terminal 100 is not authenticated by the display device 200 any longer, the mobile terminal 100 may control the display device 200.

In operation S720, the mobile terminal 100 may obtain additional information corresponding to the object selected from the display device 200 based on a second input. That is, in a case where the second input is received, the mobile terminal 100 may request the additional information corresponding to the object selected based on the first input from the display device 200. In this case, the mobile terminal 100 may obtain the additional information from the display device 200 or through the server 300. This will be described in detail with reference to FIG. 8 later.

In operation S730, the mobile terminal 100 may display the obtained additional information on a screen. The mobile terminal 100 may display the additional information after storing the additional information in the storage unit by downloading it or may display the additional information by streaming it.

The additional information according to an exemplary embodiment may include preview information, prelistening information, application information, user review information, advertisement image information, update information, newspaper article information, goods information, movie information, game information, album information, etc.

Figure 8:
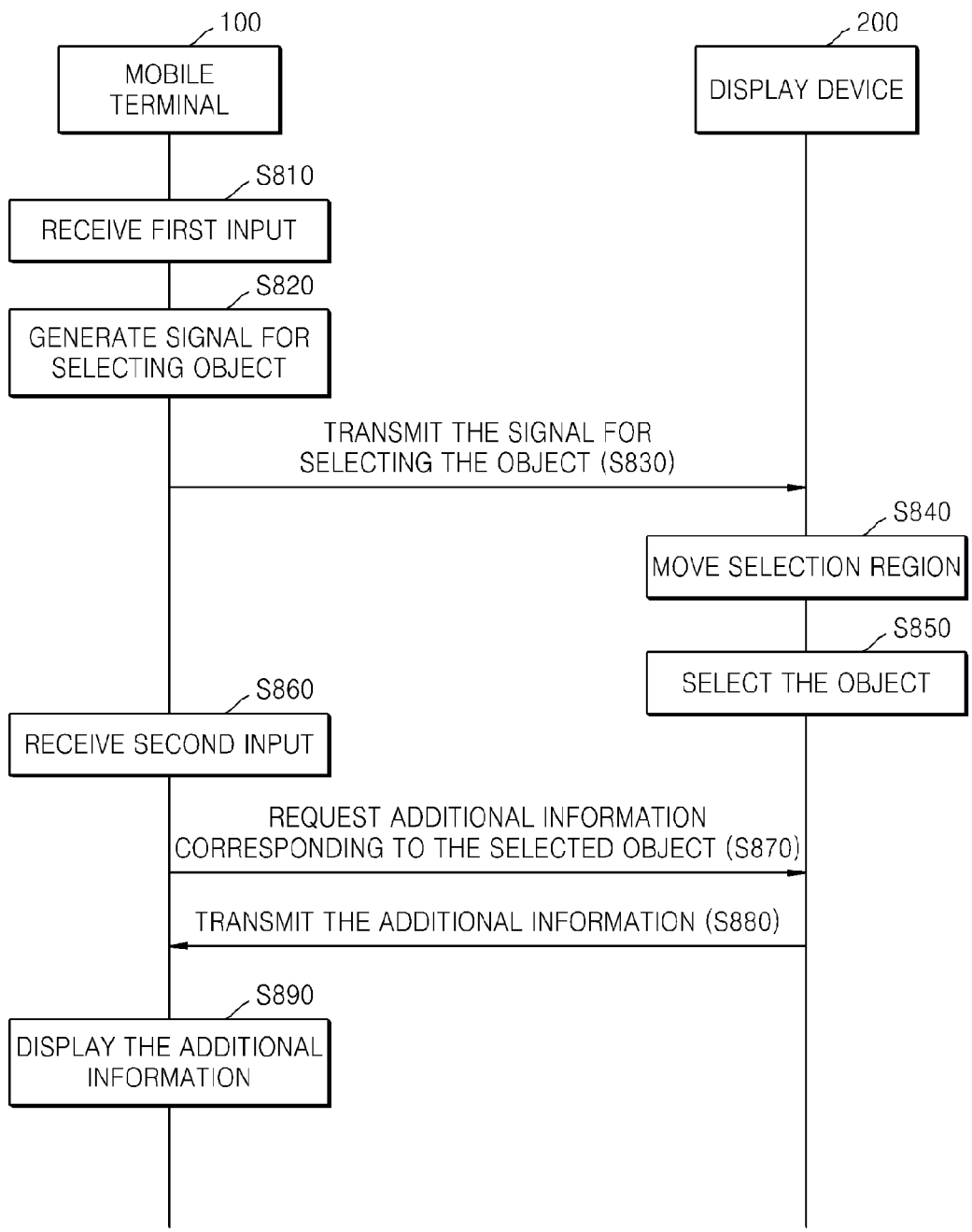
FIG. 8 is a detailed flowchart illustrating a method in which a mobile terminal displays information, according to an exemplary embodiment.

This will be described in more detail with reference to FIG. 8 later. FIG. 8 is a detailed flowchart illustrating a method in which the mobile terminal 100 displays information, according to an exemplary embodiment.

In operation S810, the mobile terminal 100 may receive a first input. The first input of the mobile terminal 100 may be a motion input (for example, a 3D motion input, a rotational motion input, etc.), a key input, a touch input, a bending input, a voice input, a multimodal input, etc. That is, a user may move the mobile terminal 100 up (+Y axial direction) and down (−Y axial direction) and left (−X axial direction) and right (+X axial direction), touch (flick, drag, tap, pan, etc.) a screen (or a GUI displayed on the screen) of the mobile terminal 100 up and down and left and right, manipulate a movement (direction) key, bend a predetermined region (left top, right top, left bottom, and right bottom) of the mobile terminal 100, or input voice including a movement command. In operation S820, the mobile terminal 100 may generate a signal for selecting an object based on the first input. For example, in a case where the first input is the motion input in which the mobile terminal 100 moves up and down and left and right, the mobile terminal 100 may generate a signal for controlling a movement of a selection region according to the movement of the mobile terminal 100. That is, in a case where the user moves the mobile terminal 100 to the left (−X axial direction) by more than a predetermined value, the mobile terminal 100 may generate a control signal for moving the selection region one space to the left.

In a case where the first input is the touch input in which a touch screen is touched up and down and left and right, the mobile terminal 100 may generate a signal for controlling the movement of the selection region according to a touch gesture of the user. For example, in a case where the user uses a finger or an electronic pen to flick the touch screen from the left to the right more by than a predetermined distance, the mobile terminal 100 may generate a control signal for moving the selection signal one space to the right.

In a case where the first input is the key input in which the movement (direction) key is manipulated, the mobile terminal 100 may generate a control signal for moving the selection region to a location corresponding to the direction key.

In a case where the first input is the bending input in which a predetermined region of the mobile terminal 100, which may be formed of a flexible display, is bent, the mobile terminal 100 may generate a control signal for moving the selection region in a direction corresponding to a bending motion. "Bending" may be a bending or deformation of the mobile terminal 100 by an external force. The "bending motion" may be a bending movement or deformation of the mobile terminal 100.

For example, in a case where the user bends the top of the mobile terminal 100, the mobile terminal 100 may generate a control signal for moving the selection region one space upward, in a case where the user bends a left region of the mobile terminal 100, the mobile terminal 100 may generate a control signal for moving the selection region one space to the left, and, in a case where the user bends the whole of the mobile terminal 100, the mobile terminal 100 may generate a control signal for selecting an object including a current selection region.

In a case where the first input is the voice input, the mobile terminal 100 may generate a control signal for moving the selection region to a location corresponding to the voice input. For example, in a case where the user says "move three spaces to the left", the mobile terminal 100 may generate a control signal for moving the selection region by three spaces to the left.

In operation S830, the mobile terminal 100 may transmit the signal for selecting the object generated based on the first input to the display device 200. The mobile terminal 100 according to an exemplary embodiment may transmit the signal for selecting the object to the display device 200 directly or through the server 300. The mobile terminal 100 according to an exemplary embodiment may also transmit the signal for selecting the object using various communication methods.

For example, in a case where the mobile terminal 100 and the display device 200 are within a predetermined range (local area distance), the mobile terminal 100 may transmit the signal for selecting the object to the display device 200 directly by short-range wireless communication (Bluetooth, Zigbee, near field communication (NFC), Wi-Fi direct (WFD), ultra-wideband (UWB), infrared data association (IrDA), etc.). The mobile terminal 100 may also transmit the signal for selecting the object over a mobile communication network (for example, 2G/3G/4G, Wibro, etc.) or a wireless local area network (LAN) (Wi-Fi: ad-hoc mode, infrastructure mode).

In operation S840, the display device 200 may move the selection region based on the first input of the mobile terminal 100. For example, in a case where the first input is the motion input in which the mobile terminal 100 is moved to the left (−X axial direction), the display device 200 moves the selection region to the left.

According to an exemplary embodiment, the display device 200 may control a movement speed of the selection region based on the first input. For example, in a case where the first input is the motion input, if the user moves the mobile terminal 100 to the right at a speed higher than a threshold speed, the display device 200 may move the selection region several spaces (for example, every 3 spaces) to the right, and, if the user moves the mobile terminal 100 to the left at a speed lower than the threshold speed, the display device 200 may move the selection region one space to the left.

According to an exemplary embodiment, in a case where the first input is the touch input, if the user drags the touch screen of the mobile terminal 100 at a speed higher than the threshold speed, the display device 200 may move the selection region several spaces, and, if the user drags the touch screen of the mobile terminal 100 at a speed lower than the threshold speed, the display device 200 may move the selection region by one space.

According to an exemplary embodiment, in a case where the first input is the bending input, the display device 200 may control the movement speed of the selection region based on how many times the user bends the predetermined region of the mobile terminal 100. For example, in a case where the user bends the top of the mobile terminal 100 three times, the display device 200 may move the selection region by three spaces upward, and, in a case where the user bends the right region of the mobile terminal 100 twice, the display device 200 may move the selection region by two spaces to the right. In addition, there are diverse examples in which the display device 200 moves the selection region based on the first input.

According to an exemplary embodiment, the display device 200 may adjust the number of objects displayed on the screen based on the first input. For example, in a case where the first input is the motion input, if the user moves the mobile terminal 100 in a front direction (+Z axial direction), the display device 200 may reduce the number of objects displayed on the screen, and, if the user moves the mobile terminal 100 in a rear direction (−Z axial direction), the display device 200 may increase the number of objects displayed on the screen.

According to an exemplary embodiment, in a case where the first input is the touch input, if the user multi-touches at least two points on the touch screen of the mobile terminal 100 and drags the two points away from each other, the display device 200 may reduce the number of objects displayed on the screen, and, if the user drags the two points closer to each other, the display device 200 may increase the number of objects displayed on the screen.

According to an exemplary embodiment, in a case where the first input is the bending input, if the user bends a center portion of the mobile terminal 100 to be convex, the display device 200 may reduce the number of objects displayed on the screen, and, if the user bends a center portion of the mobile terminal 100 to be concave, the display device 200 may increase the number of objects displayed on the screen.

In addition, there are diverse examples in which the display device 200 adjusts the number of objects displayed on the screen based on the first input.

According to an exemplary embodiment, while the display device 200 selects an object based on the first input of the mobile terminal 100, the mobile terminal 100 may receive and display thumbnail information of contents corresponding to the object in which the selection region is disposed from the display device 200. For example, the mobile terminal 100 may display an image, an icon, a title, a type of contents, etc. of the contents corresponding to the object in which the selection region is disposed. The mobile terminal may display a location of the selection region corresponding to a current location of the mobile terminal 100 and a movement direction of the selection region on an entire screen of the display device 200.

According to another exemplary embodiment, the mobile terminal 100 may turn its screen off or blacken its screen in such a way that the users eyes are not distracted from the screen of the display device 200 on which the object is selected.

In operation S850, the display device 200 selects the object. According to an exemplary embodiment, the display device 200 may select an object in which the moved selection region is disposed based on the first input.

According to an exemplary embodiment, the display device 200 may identify (emphasize) the object in which the selection region is disposed. For example, the display device 200 may indicate a border of the object in which the selection region is disposed as a box, increase a size of the object in which the selection region is disposed compared to other objects, or make an animation effect such as blinking.

In operation S860, the mobile terminal 100 may receive a second input. The second input according to an exemplary embodiment may be a user input for obtaining additional information. The second input of the mobile terminal 100 according to an exemplary embodiment may include at least one of a motion input, a key input, a bending input, and a voice input. For example, the user may rotate the mobile terminal 100 at a predetermined angle, bend a center portion of the mobile terminal 100, press a selection key of the mobile terminal 100, touch (tap) a GUI on the screen requesting the additional information, or input a voice requesting the additional information. The second input is not limited thereto and there may be diverse examples thereof.

In operation S870, the mobile terminal 100 may request the additional information corresponding to the selected object from the display device 200. According to an exemplary embodiment, the mobile terminal 100 may request the additional information from the display device 200 directly or through the server 300.

According to an exemplary embodiment, the mobile terminal 100 may request the additional information from the display device 200 through diverse communication methods such as short-range wireless communication (Bluetooth, Zigbee, NFC, WFD, UWB, IrDA, etc., mobile communication (for example, 2G/3G/4G, Wibro, etc.) or a wireless LAN (Wi-Fi: ad-hoc mode, infrastructure mode).

In operation S880, the display device 200 may transmit the additional information corresponding to the selected object to the mobile terminal 100. For example, in a case where an object related to movie contents is selected, the display device 200 may transmit additional information (representative scenes, preview video, production information, synopsis information, actors, director information, user review information, etc.) regarding the movie contents to the mobile terminal 100.

In a case where an object relating to an application is selected, the display device 200 may transmit additional information (for example, an explanation of the application, application review information, application update information, etc.) regarding the application to the mobile terminal 100.

According to an exemplary embodiment, in a case where an object relating to a photo is selected, the display device 200 may transmit additional information including metadata (for example, a place photograph was taken, photographing time, etc.) of the photo, information (for example, newspaper articles, appearance movies, representative music, etc.) relating to characters in the photo to the mobile terminal 100.

According to an exemplary embodiment, in a case where an object relating to music is selected, the display device 200 may transmit additional information including album information, music video, teaser video, prelistening information, newspaper articles, singer information, etc. regarding the music to the mobile terminal 100.

According to an exemplary embodiment, in a case where an object relating to a Website is selected, the display device 200 may transmit additional information including preview information regarding the Website to the mobile terminal 100.

According to an exemplary embodiment, in a case where an object relating to an EPG is selected, the display device 200 may transmit additional information including a broadcasting program synopsis, preview information per episode, etc. regarding the EPG to the mobile terminal 100. In a case where an object relating to a shopping item is selected, the display device 200 may transmit additional information including goods information, order information, recommendation information, etc. regarding the shopping item to the mobile terminal 100.

According to an exemplary embodiment, the display device 200 may transmit additional information previously stored in a storage unit to the mobile terminal 100. If link information of the additional information is only stored in the storage unit, the display device 200 may receive the additional information from the server 300 and transmit the received additional information to the mobile terminal 100. The display device 200 may search for the additional information relating to the object in a search engine or a Website and provide the found additional information to the mobile terminal 100.

In operation S890, the mobile terminal 100 may display the obtained additional information. The mobile terminal 100 may control the displayed additional information based on a user input. This will now be described in detail with reference to FIG. 9.

As described above, according to an exemplary embodiment, the user may search for and/or select an object relating to contents displayed on the external display device 200 through a simple input of the mobile terminal 100 and confirm additional information relating to the selected object to determine whether to receive corresponding contents.

Figure 9:
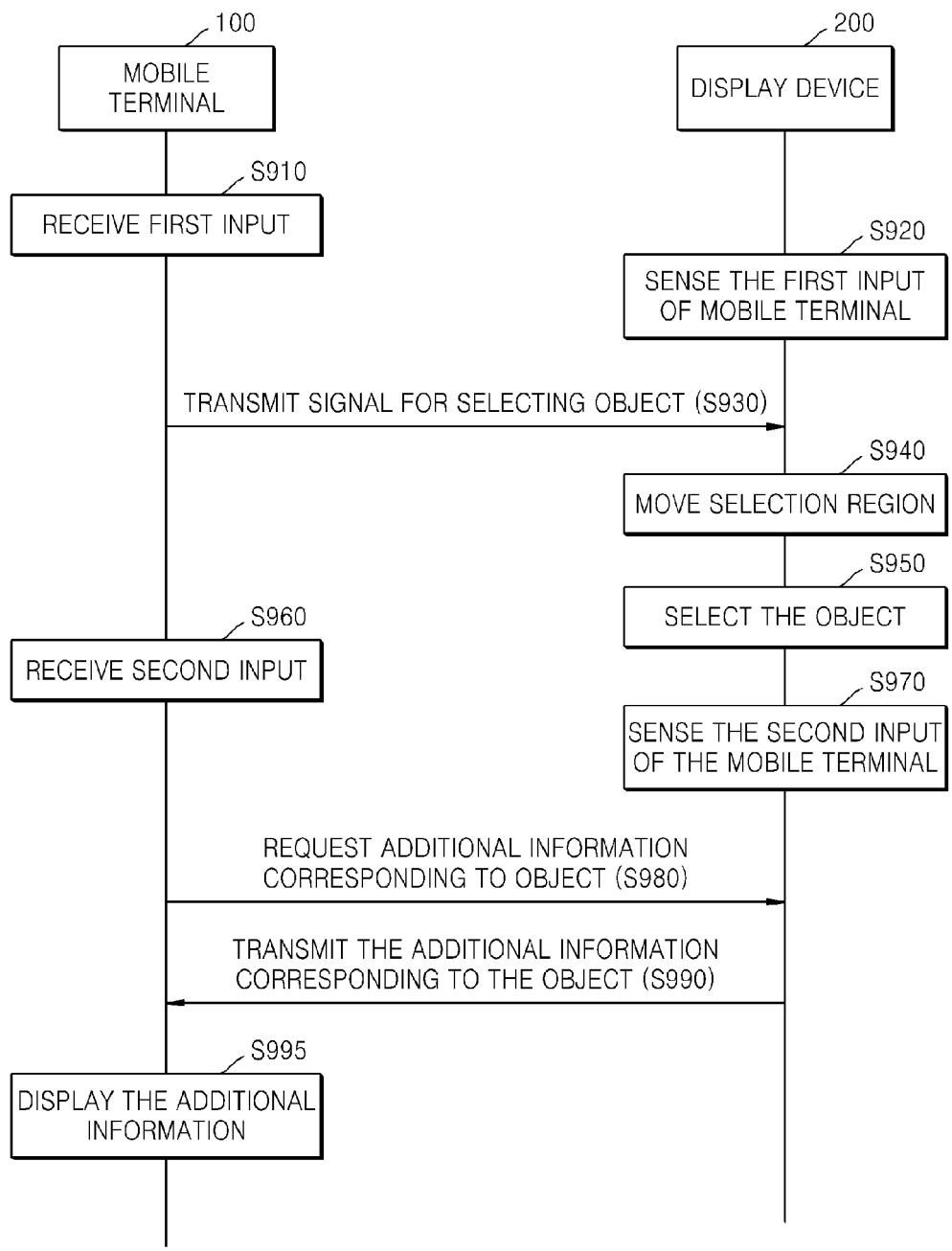
FIG. 9 is a flowchart illustrating a method in which a display device senses an input of a mobile terminal and provides additional information, according to an exemplary embodiment.

FIG. 9 is a flowchart illustrating a method in which the display device 200 senses an input of the mobile terminal 100 and provides additional information, according to an exemplary embodiment. Redundant descriptions between FIGS. 8 and 9 are omitted here.

Referring to FIG. 9, according to an exemplary embodiment, the mobile terminal 100 may receive a first input in operation S910 and the display device 200 may sense the input of the mobile terminal 100.

For example, in operation S920, the display device 200 may sense a first input of the mobile terminal 100 for selecting an object. Operations S930 through S960 of FIG. 9 correspond to operations S810 through S860 of FIG. 8, and thus redundant descriptions thereof will be omitted here. In operation S970, the display device 200 may sense a second input of the mobile terminal 100 for obtaining additional information corresponding to the selected object. Operations S980 through S995 of FIG. 9 correspond to operations S870 through S890 of FIG. 8, and thus redundant descriptions thereof will be omitted here.

The first input and the second input of the mobile terminal 100 may include at least one of a motion input (for example, a 3D motion input, a rotational motion input, etc.), a key input, a touch input, a bending input, and a voice input.

According to an exemplary embodiment, in a case where the first input and the second input are motion inputs, the display device 200 may sense a motion of the mobile terminal 100 through a camera. For example, in a case where the user moves the mobile terminal 100 up and down and left and right or rotates the mobile terminal 100, the display device 200 may sense the up and down and left and right motion of the mobile terminal 100 or the rotation of the mobile terminal 100.

According to an exemplary embodiment, in a case where the first input and the second input are bending inputs, the display device 200 may sense a bending motion of the mobile terminal 100 through the camera. For example, the display device 200 may sense a bending location (a coordinate value) of the mobile terminal 100, a bending direction, a bending angle, a bending speed, a bending frequency, a bending motion occurrence time, a bending motion continuance time period, etc.

According to an exemplary embodiment, in a case where the first input and the second input are touch inputs, the display device 200 may sense a touch gesture of the user through the camera.

According to an exemplary embodiment, in a case where the first input and the second input are voice inputs, the display device 200 may sense a voice input of the user through a microphone.

That is, according to an exemplary embodiment, the display device 200 may sense the first input or the second input to authenticate a signal for selecting an object received from the mobile terminal 100 or a signal for requesting additional information corresponding to the object. For example, in a case where the display device 200 senses a motion input in which the mobile terminal 100 moves to the right (+X axial direction) and receives a control signal for moving a selection region by one space to the left from the mobile terminal, the display device 200 may request the control signal from the mobile terminal 100 again or may not follow the control signal for moving the selection region by one space to the left.

According to another exemplary embodiment, the display device 200 may sense the first input or the second input to directly generate a control command for moving the selection region for selection of the object, a control command for selecting the object, and a control command for transmitting the additional information to the mobile terminal 100.

Figure 10:
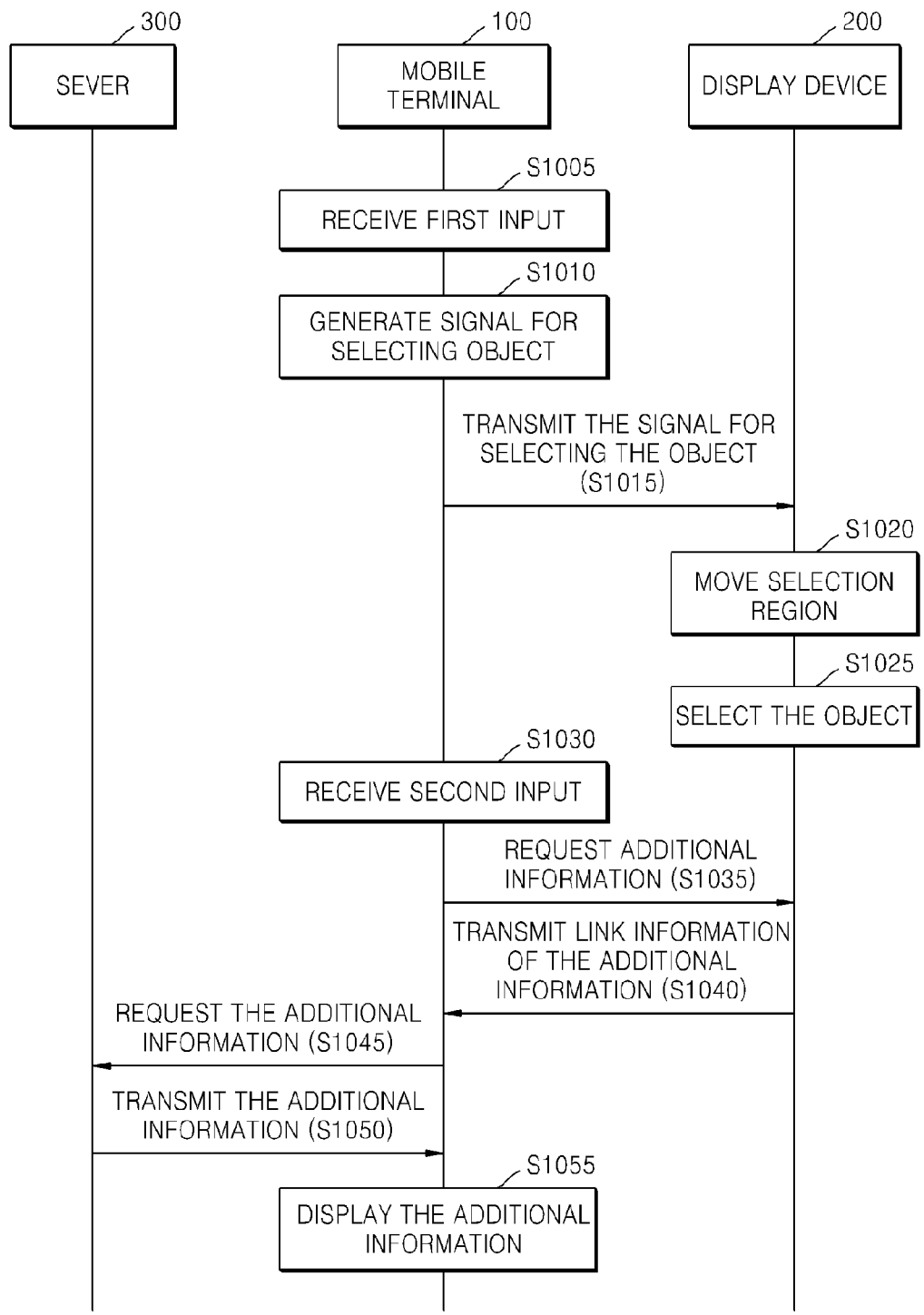
FIG. 10 is a flowchart illustrating a method in which a mobile terminal obtains additional information through a server, according to an exemplary embodiment.

FIG. 10 is a flowchart illustrating a method in which the mobile terminal 100 obtains additional information through the server 300, according to an exemplary embodiment. Operations S1005 through S1035 of FIG. 10 correspond to operations S810 through S870 of FIG. 8, and thus redundant descriptions thereof will be omitted here.

In operation S1035, in a case where the display device 200 receives an additional information request from the mobile terminal 100 based on a second input of the mobile terminal 100, in operation S1040, the display device 200 may transmit link information (for example, a URI) of the additional information to the mobile terminal 100.

In this case, in operation S1045, the mobile terminal 100 requests the additional information from the server 300 based on the link information of the additional information. According to an exemplary embodiment, the mobile terminal 100 may request additional information from the server 300 over a mobile communication network (for example, 2G/3G/4G, Wibro, etc.) or a wireless local area network (LAN) (Wi-Fi: ad-hoc mode, infrastructure mode).

In operation S1050, the mobile terminal 100 may receive the additional information from the server 300. The mobile terminal 100 may receive the additional information from the server 300 by downloading or streaming it.

In operation S1055, the mobile terminal 100 may display the additional information received from the server 300. In a case where the additional information is a moving image, the display of the additional information may include playing thereof.

Figure 11:
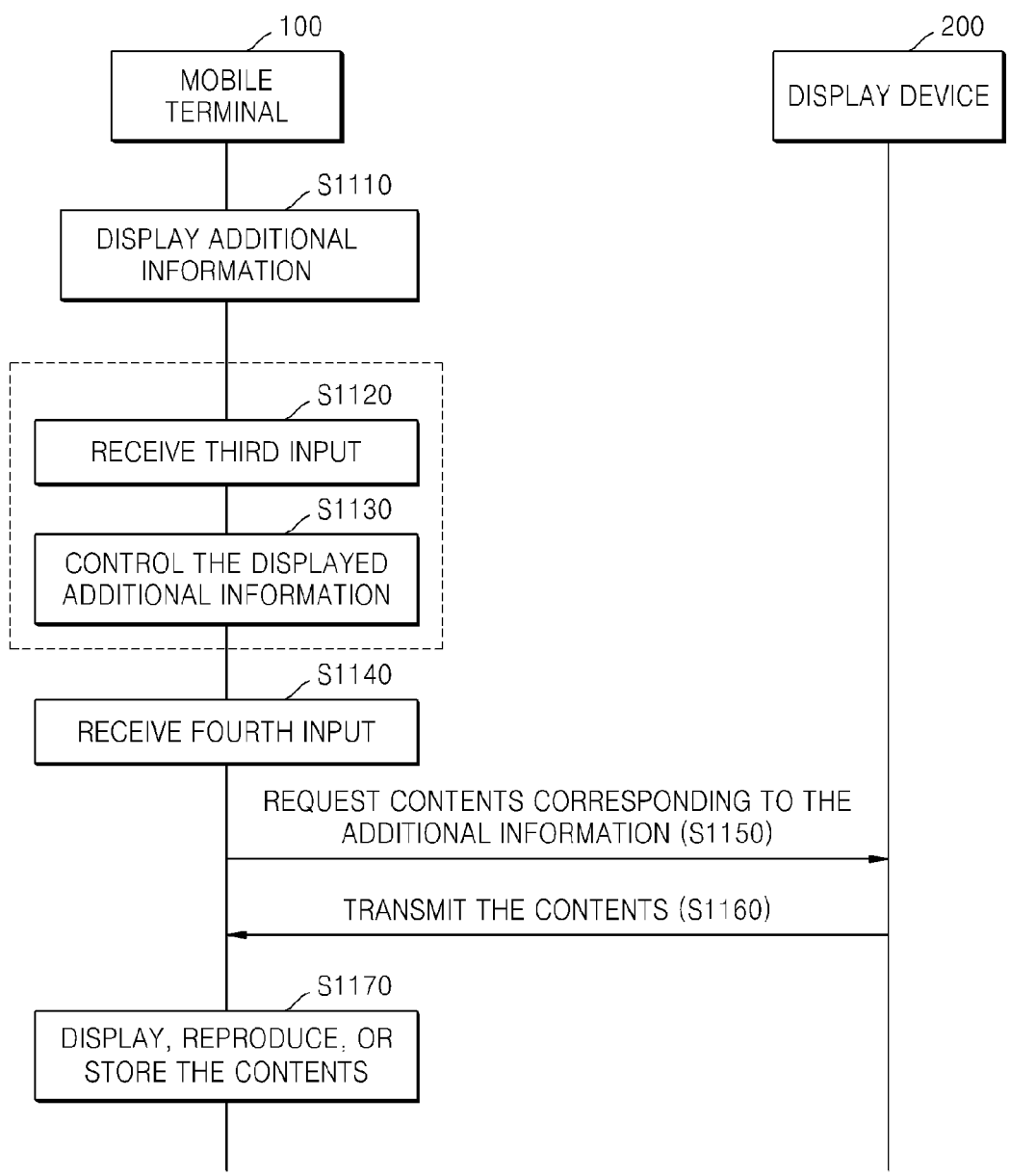
FIG. 11 is a flowchart illustrating a method in which a mobile terminal obtains contents, according to an exemplary embodiment.

FIG. 11 is a flowchart illustrating a method in which the mobile terminal 100 obtains contents, according to an exemplary embodiment.

In operation S1110, the mobile terminal 100 may display additional information obtained from the display device 200 or the server 300. In operation S1120, the mobile terminal 100 may receive a third input for controlling the additional information displayed on a screen.

The third input of the mobile terminal 100 may include at least one of a motion input (for example, a 3D motion input, a rotational motion input, etc.), a key input, a touch input, a bending input, and a voice input.

In operation S1130, the mobile terminal 100 may control the displayed additional information based on the third input. According to an exemplary embodiment, the mobile terminal 100 may control at least one of a display of the additional information, playing (or pausing), and a change to previous additional information or next additional information based on the third input. For example, the mobile terminal 100 may move to the previous additional information or the next additional information according to a swipe gesture of the user, a shuffle gesture, a flick gesture, etc.

In operation S1140, the mobile terminal 100 may receive a fourth input. The fourth input according to an exemplary embodiment may be an input for obtaining contents corresponding to the additional information displayed on the mobile terminal 100.

The fourth input of the mobile terminal 100 according to an exemplary embodiment may include at least one of a motion input (for example, a 3D motion input, a rotational motion input, etc.), a key input, a touch input, a bending input, and a voice input.

In operation S1150, the mobile terminal 100 may request contents corresponding to the additional information from the display device 200 based on the fourth input. That is, the user may determine whether to receive the contents after confirming the additional information related to the contents through the mobile terminal 100.

According to an exemplary embodiment, the mobile terminal 100 may request contents corresponding to the additional information from the display device 200 using various types of communication (for example, short-range wireless communication, mobile communication, wireless Internet communication, etc.)

In operation S1160, the mobile terminal 100 may receive the contents from the display device 200. According to an exemplary embodiment, the display device 200 may transmit contents previously stored in a storage unit to the mobile terminal 100.

In operation S1170, the mobile terminal 100 may display or reproduce the obtained contents or store them in the storage unit.

Figure 12:
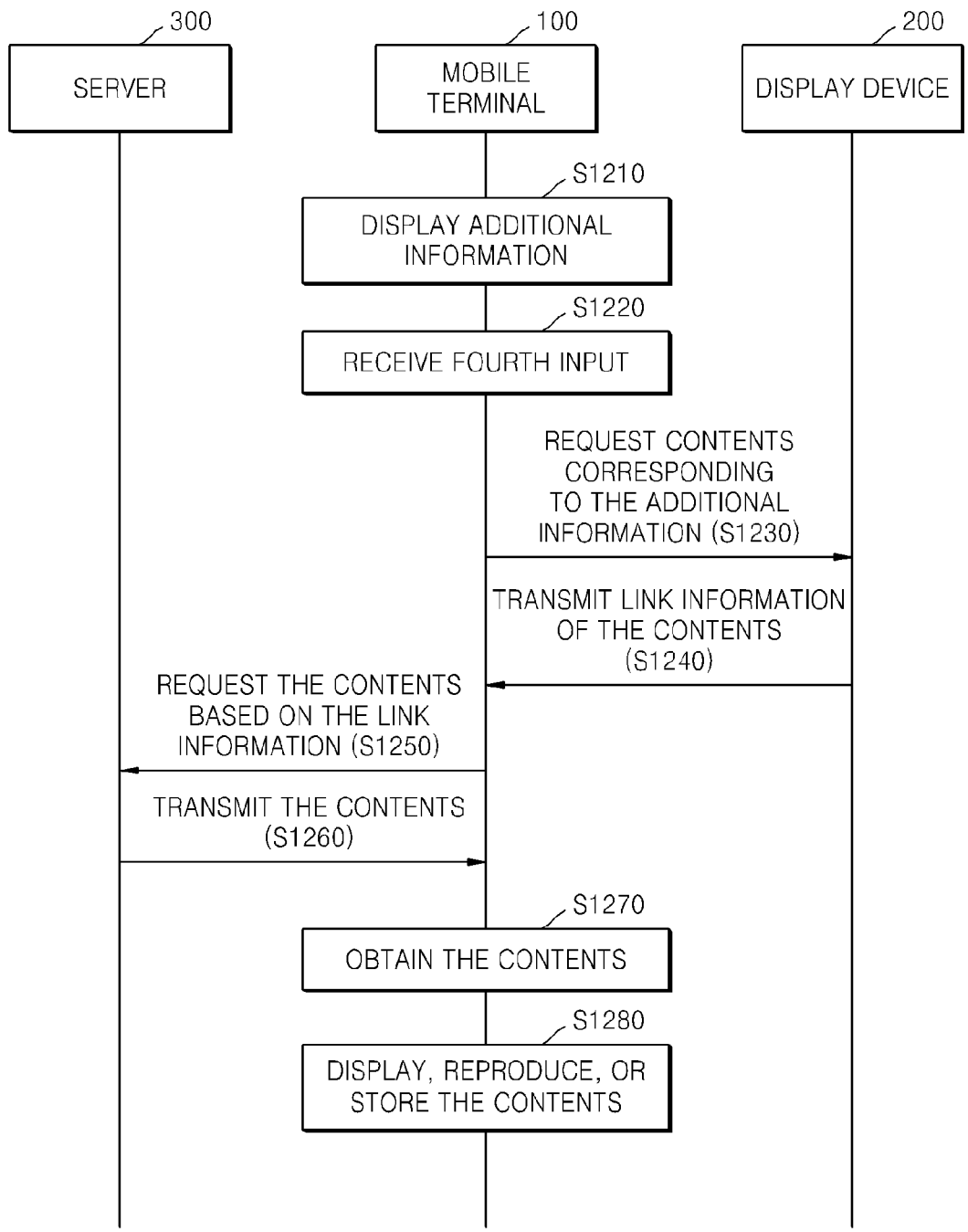
FIG. 12 is a flowchart illustrating a method in which a mobile terminal obtains contents through a server, according to an exemplary embodiment.

FIG. 12 is a flowchart illustrating a method in which the mobile terminal 100 obtains contents through the server 300, according to an exemplary embodiment. Operations S1210 through S1230 of FIG. 12 correspond to operations S1110, S1140, and S1150 of FIG. 11, and thus redundant descriptions thereof will be omitted here.

In operation S1230, the display device 200 may receive a request for contents corresponding to additional information based on a fourth input of the mobile terminal 100 In operation S1240, the display device 200 may transmit link information (for example, a URI) of the contents corresponding to the additional information to the mobile terminal 100.

In this case, in operation S1250, the mobile terminal 100 requests the contents from the server 300 based on link information of the contents. According to an exemplary embodiment, the mobile terminal 100 may request the contents from the server 300 over a mobile communication network (for example, 2G/3G/4G, Wibro, etc.) or a wireless LAN (Wi-Fi: ad-hoc mode, infrastructure mode).

The contents according to an exemplary embodiment may include at least one of a still image (for example, a photo, a picture, a document, an e-book, etc.), a moving image (for example, a movie, a TV broadcasting program, a YouTube video, an advertisement (teaser), an image, etc.), an application (for example, a game, a household account, a diary, etc.), music (a song, lyrics, a music video, etc.), a webpage, and an EPG.

In operation S1270, the mobile terminal 100 may receive the contents from the server 300. According to an exemplary embodiment, the mobile terminal 100 may receive the contents from the server by downloading or streaming it (operation S1260).

In operation S1280, the mobile terminal 100 may display or reproduce the obtained contents or store them in the storage unit. In this regard, according to an exemplary embodiment, the mobile terminal 100 may receive a user input to control the contents displayed or reproduced on the screen. For example, the mobile terminal 100 may control playing of the contents, pausing, a play speed, a play frequency, skipping, etc. based on at least one of a touch input of the user, a bending input, a key input, a voice input, and a motion input.

Figure 13:
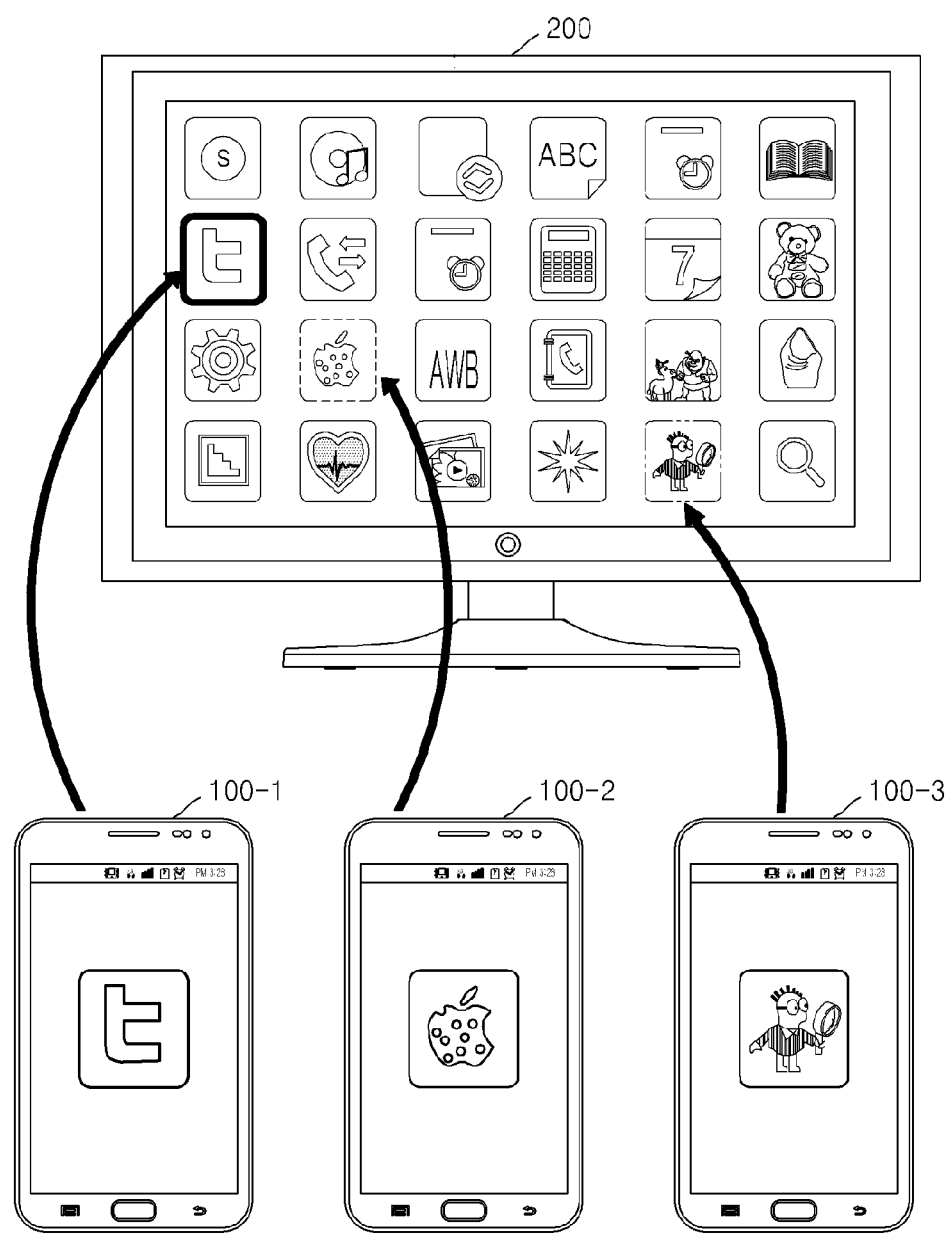
FIG. 13 is a view of a screen on which each of a plurality of mobile terminals selects an object of a display device, according to an exemplary embodiment.

FIG. 13 is a view of a screen on which each of a plurality of mobile terminals 100-1, 100-2, and 100-3 selects an object of the display device 200, according to an exemplary embodiment.

Referring to FIG. 13, each of the first through third mobile terminals 100-1, 100-2, and 100-3 selects the object of the display device 200.

In this regard, the display device 200 may display the objects selected based on a first input of each of the first through third mobile terminals 100-1, 100-2, and 100-3. For example, a border of the object selected by the first mobile terminal 100-1 may be displayed in bold, a border of the object selected by the second mobile terminal 100-2 may be displayed as a dotted line, and a border of the object selected by the third mobile terminal 100-3 may be displayed as an alternating long and short dashed line.

According to an exemplary embodiment, each of the first through third mobile terminals 100-1, 100-2, and 100-3 may freely select the objects on the display device 200 or receive additional information of the selected objects without any interference from the other mobile terminals.

The construction of the mobile terminal 100 according to an exemplary embodiment will now be described in detail with reference to FIG. 14.

Figure 14:
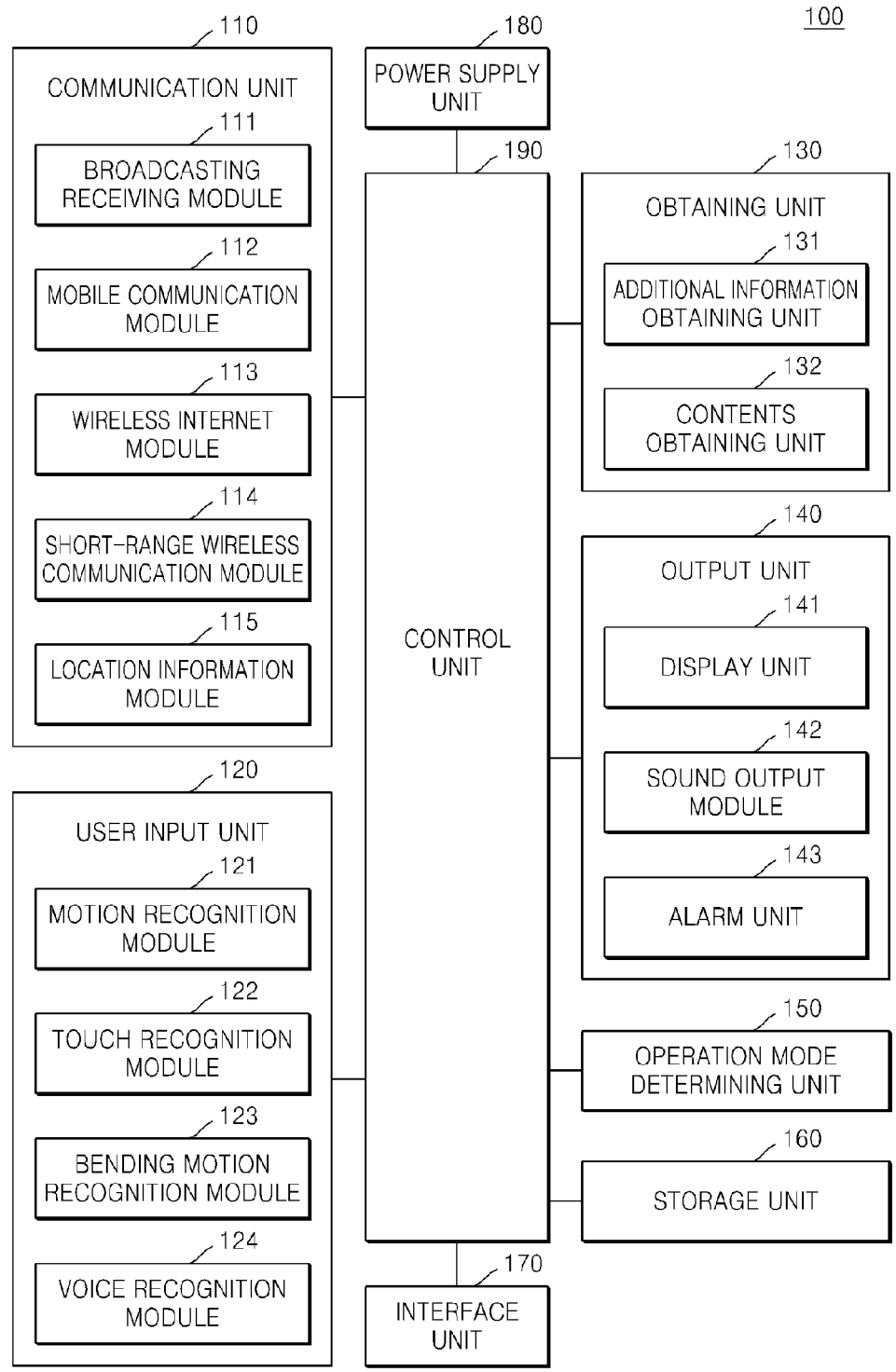
FIG. 14 is a block diagram of a mobile terminal, according to an exemplary embodiment.

FIG. 14 is a block diagram of the mobile terminal 100, according to an exemplary embodiment.

Referring to FIG. 14, the mobile terminal 100 according to an exemplary embodiment may include a communication unit 110, a user input unit 120 (e.g., a user input, etc.), an obtaining unit 130, an output unit 140, an operation mode determining unit 150, a storage unit 160, an interface unit 170, a power supply unit 180, and a control unit 190 (e.g., controller, etc.). However, these elements may not all be essential. The mobile terminal 100 may be implemented with more or less elements than the elements of FIG. 14.

The above elements will now be sequentially described below.

The communication unit 110 may include one or more elements for communication between the mobile terminal 100 and the display device 200 or between networks in which the mobile terminal 100 and the display device 200 are disposed. For example, the communication unit 110 may include a broadcasting receiving module 111, a mobile communication module 112, a wireless Internet module 113, a short-range wireless communication module 114, and a location information module 115.

The broadcasting receiving module 111 may receive a broadcasting signal and/or broadcasting information from an external broadcasting management server over a broadcasting channel. The broadcasting channel may include a satellite channel and a terrestrial wave channel. The broadcasting management server may be a server that generates and transmits the broadcasting signal and/or the broadcasting information or a server that receives and transmits a previously generated broadcasting signal and/or broadcasting information. The broadcasting information may be information relating to a broadcasting channel, a broadcasting program, or a broadcasting service provider. The broadcasting signal may include a TV broadcasting signal, a radio broadcasting signal, and a data broadcasting signal as well as a broadcasting signal that is a combination of the TV broadcasting signal or the radio broadcasting signal and the data broadcasting signal.

The mobile communication module 112 may transmit and receive a wireless signal to and from at least one of a base station, the external display device 200, and the server 300 over a mobile communication network. In this regard, the wireless signal may include a voice call signal, a conference call signal, or various types of data according to transmission and reception of text and multimedia messages.

The wireless Internet module 113 refers to a module for wireless Internet access, and may be included in or excluded from the mobile terminal 100.

The short-range wireless communication module 114 refers to a module for short-range wireless communication. A short-range wireless communication technology may include Wi-Fi, Bluetooth, Zigbee, WFD, UWB, IrDA, etc. but an exemplary embodiment is not limited thereto.

The location information module 115 is a module for confirming or obtaining a location of the mobile terminal 100. An example of the location information module 115 may be a global positioning system (GPS) module. The GPS module receives location information from a plurality of satellites. In this regard, the location information may include coordinate information indicated by latitude and longitude. In particular, the GPS module may obtain locations of latitude, longitude, and altitude as well as 3D speed information and accurate time from the location information received from the satellites.

The communication unit 110 according to an exemplary embodiment may request control authorization from the display device 200 and receive a control authorization acceptance message. In this case, the communication unit 110 may transmit a control signal to the display device 200. For example, the communication unit 110 may transmit to the display device 200 a signal for selecting at least one object from an object list displayed on the display device 200. The signal for selecting the object may include a signal for controlling a movement of a selection region for selecting the object. The selection region may be a region on the display device 200 in which a cursor or a pointer is disposed.

The communication unit 110 may transmit a signal for controlling at least one of a movement direction of the selection region, a movement speed, and the number of objects displayed on the screen of the display device 200 to the display device 200.

The communication unit 110 may receive at least one of additional information corresponding to the object selected by the display device 200, link information of the additional information, the object, and link information of the object from the display device 200. The link information refers to access information regarding a website in which contents are disposed. An example of the link information may include a uniform resource locator (URL).

The communication unit 110 may receive the additional information from the server 300 based on the link information of the additional information. The communication unit 110 may receive the object from the server based on the link information of the object.

The user input unit 120 is a unit that allows the user to input data for controlling the mobile terminal 100. The user input unit 120 may include a key pad, a dome switch, a touch pad (a contact type electrostatic capacitive method, a pressure resistive layer method, an infrared ray sensing method, a surface ultrasonic wave conduction method, an integration type tension measurement method, a piezo effect method, or the like), a jog wheel, a jog switch, or the like. In particular, when the touch pad configures a layer structure with a display unit 141, which is described below, the touch pad may be referred to as a touch screen.

The user input unit 120 may include at least one module for receiving an input of data from the user. For example, the user input unit 120 may include a motion recognition module 121, a touch recognition module 122, a bending motion recognition module 123, a voice recognition module 124, etc.

The motion recognition module 121 may recognize a movement of the mobile terminal 100 and transfer information regarding the movement of the mobile terminal 100 to the control unit 190.

The mobile motion recognition module 121 may include diverse sensors for recognizing the movement of the mobile terminal 100. For example, the mobile motion recognition module 121 may include an acceleration sensor, a tilt sensor, a gyro sensor, a 3-axis magnetic sensor, etc.

A motion input according to an exemplary embodiment may include a 3D motion input in which the mobile terminal 100 is moved in X-axial, Y-axial, and Z-axial directions, a rotation motion input in which the mobile terminal 100 is rotated in at least one direction on a 3D space, and a shaking motion input in which the mobile terminal 100 is shaken in at least one direction.

The touch recognition module 122 may sense a touch gesture on a touch screen of the user and transfer information regarding the touch gesture to the control unit 190.

Various sensors may be disposed inside or in the vicinity of the touch screen so as to sense a real-touch or a proximity-touch on the touch screen. A tactile sensor is an example of a sensor for sensing a touch on the touch screen. The tactile sensor is a sensor for sensing a touch on a particular object at the same degree of human touch sensitivity or higher. The tactile sensor may sense various types of information, such as roughness of a touch surface, hardness of a touched object, temperature of a touch point, and the like.

A proximity sensor is an example of a sensor for sensing a touch of the touch screen.

The proximity sensor refers to a sensor that detects whether an object approaches a predetermined detection surface or an object exists in the vicinity of the predetermined detection surface by using a force of an electronic system or infrared rays without any mechanical touch. Examples of proximity sensors include a transmissive photoelectric sensor, a direct reflective photoelectric sensor, a mirror reflective photoelectric sensor, a radio frequency oscillation proximity sensor, an electrostatic capacitive proximity sensor, a magnetic proximity sensor, an infrared ray proximity sensor, and the like.

The touch gesture of the user may include tap, touch & hold, double tap, drag, panning, flick, drag and drop, and the like.

The bending motion recognition module 123 may sense a bending motion of the mobile terminal 100 and transfer information regarding the sensed bending motion to the control unit 190. "Bending" may be a bending or deformation of the mobile terminal 100 by an external force. The "bending motion" may be a bending movement of the mobile terminal 100. The bending motion according to an exemplary embodiment may be diverse. For example, the bending motion according to an exemplary embodiment may refer to all bending movements of the mobile terminal 100 by a folding gesture made by the user, a rolling gesture, a shaking gesture, a bending gesture, etc.

According to an exemplary embodiment, the bending motion recognition module 123 may include a bending sensor for sensing the bending motion. The bending motion recognition module 123 may collect and analyze information regarding the bending motion from a plurality of bending sensors to sense the bending motion of the mobile terminal 100.

The bending motion recognition module 123 may obtain information regarding a bending location (a coordinate value) of the mobile terminal 100, a bending direction, a bending angle, a bending speed, a bending frequency, a bending motion occurrence time, and/or a bending motion continuance time with respect to the bending motion.

For example, the bending motion recognition module 123 may calculate the bending location and the bending direction by using a characteristic that a pressure of a bending part and a pressure of a non-bending part are different from each other. The bending motion recognition module 123 may calculate the bending angle, a bending diameter, the bending frequency, the bending speed, etc. based on a variation in force of the bending part. The bending motion recognition module 123 may measure a speed at which each part is modified by using the acceleration sensor and connect locations having a great speed variation to calculate the bending location and the bending angle.

The voice recognition module 124 may recognize a users voice by using a voice recognition engine and transfer the recognized user's voice to the control unit 190.

The user input unit 120 according to an exemplary embodiment may receive a first input of the mobile terminal 100 for selecting an object of the display device 200, a second input of the mobile terminal 100 for obtaining additional information of the selected object, a third input of the mobile terminal 100 for controlling the additional information displayed on the mobile terminal 100, and a fourth input of the mobile terminal 100 for obtaining contents corresponding to the additional information.

The first input, the second input, the third input, and the fourth input of the mobile terminal 100 may include at least one of a motion input, a key input, a touch input, a bending input, and a voice input.

According to an exemplary embodiment, the first input, the second input, the third input, and the fourth input of the mobile terminal 100 may be the same type of inputs or different types of inputs. For example, the first input and the second input of the mobile terminal 100 may be the motion inputs, the third input thereof may be the touch input, and the fourth input thereof may be the voice input.

The obtaining unit 130 may obtain data from the outside. The obtaining unit 130 may include an additional information obtaining unit 131 and a contents obtaining unit 132. The additional information obtaining unit 131 may request additional information corresponding to the object selected by the display device 200 from the display device 200. In this case, the additional information obtaining unit 131 may receive the additional information or link information of the additional information from the display device 200.

If the link information of the additional information is received, the additional information obtaining unit 131 may access the server 300 to obtain the additional information based on the link information of the additional information.

The contents obtaining unit 132 may request contents corresponding to the object selected by the display device 200 from the display device 200. The contents obtaining unit 132 may receive contents or link information of the contents from the display device 200. In the link information of the contents is received, the additional information obtaining unit 131 may access the server 300 to obtain the contents based on the link information of the contents.

The output unit 140 is used to output an audio signal, a video signal, or an alarm signal, and may include the display unit 141, a sound output module 142, and an alarm unit 143.

The display unit 141 displays information processed by the mobile terminal 100. For example, the display unit 141 may display the additional information corresponding to the object selected by the display device 200, the contents corresponding to the object selected by the display device 200, and thumbnail information of the contents corresponding to the object selected by the display device 200 on the screen.

The thumbnail information of the contents is schematic information indicating the contents corresponding to the selected object and may include, for example, an icon of the contents, a title, a type, identification information, etc.

As described above, in a case where the display unit 141 and the touch pad have a layer structure and are configured as a touch screen, the display unit 141 may be used as an input unit, as well as an output unit. The display unit 141 may include at least one selected from the group consisting of a liquid crystal display (LCD), a thin film transistor-liquid crystal display (TFT-LCD), an organic light-emitting diode (OLED), a flexible display, a three-dimensional (3D) display, and an electrophoretic display. The output unit 140 may include two or more display units 141 according to an implementation type of the mobile terminal 100.

The sound output module 142 receives a call signal and outputs audio data that is received from the wireless communication unit 110 or that is stored in the storage unit 160 in a calling or recording mode, a voice recognition mode, a broadcasting reception mode, etc. The sound output module 142 outputs a sound signal relating to a function (for example, a call signal receiving sound, a message receiving sound, etc.) performed by the mobile terminal 100. The sound output module 142 may include a speaker, a buzzer, etc.

The alarm unit 143 outputs a signal for notifying the user about an occurrence of an event of the mobile terminal 100. An example of the event that occurs in the mobile terminal 100 may include call signal reception, message reception, a key signal input, object selection, etc. The alarm unit 143 may output a signal for informing the user about the occurrence of the event in a different form other than the audio signal or the video signal. For example, the alarm unit 143 may output a signal in a vibration form. In a case where the call signal is received or a message, contents, and/or additional information are received, the alarm unit 143 may output a vibration to notify the user about the receiving of the call signal or the message, contents, and/or additional information. Alternatively, in a case where a key signal, a touch gesture, and a bending gesture are input, the alarm unit 143 may output the vibration as feedback of the input of the key signal, the touch gesture, and the bending gesture. The user may recognize the occurrence of the event through the above-described output of the vibration. The signal for notifying the user about the occurrence of the event may be output through the display unit 141 or the voice output module 142.

The operation mode determining unit 150 may determine an operation mode of the mobile terminal 100. Examples of the operation mode may include a mode in which the object of the display device 200 is selected, a mode in which contents corresponding to the selected object are displayed, etc.

According to an exemplary embodiment, the operation mode determining unit 150 determines the operation mode as a first mode (for example, the mode in which the object of the display device 200 is selected) in a case where the mobile terminal 100 is a vertical mode, and determines the operation mode as a second mode (for example, the mode in which the object of the display device 200 is selected) in a case where the mobile terminal 100 is in a horizontal mode.

According to an exemplary embodiment, the operation mode determining unit 150 may determine the operation mode of the mobile terminal 100 based on information displayed on the screen. For example, the operation mode determining unit 150 may determine the operation mode as the first mode in a case where the information displayed on the screen of the mobile terminal 100 is thumbnail information of the contents corresponding to an object displayed on the display device 200 or movement direction information of the mobile terminal 100. In a case where the information displayed on the screen of the mobile terminal 100 is the contents corresponding to the object displayed on the display device 200 or the additional information corresponding to the object, the operation mode determining unit 150 may determine the operation mode as the second mode.

The storage unit 160 may store a program for processing or controlling the control unit 190. The storage unit 160 may perform a function of storing input and output data. For example, the input and output data may include contents (for example, a still image, a moving image, music, a document, an application, link information, etc.) obtained from the display device 200, contents obtained from the server 300, etc.

The storage unit 160 may include at least one storage medium selected from the group consisting of flash memory, hard disk type memory, multimedia card micro type memory, card type memory (for example, SD memory, XD memory, or the like), random access memory (RAM), static RAM (SRAM), read-only memory (ROM), electrically erasable programmable read-only memory (EEPROM), programmable ROM (PROM), magnetic memory, a magnetic disk, and an optical disk. In addition, the mobile terminal 100 may operate as a web storage facilitator for performing a storing function on the Internet.

The interface unit 170 interfaces with all external devices connected to the mobile terminal 100. For example, the interface unit 170 may include a wired/wireless headset port, an external charger port, a wired/wireless data port, a memory card port, a port for connecting an apparatus including an identification module, an audio input/output (I/O) port, a video I/O port, an earphone port, etc.

In this regard, the identification module is a chip for storing various types of information used to authenticate user authorization of the mobile terminal 100, and may include a user identity module (UIM), a subscriber identity module (SIM), a universal subscriber identity module (USIM), etc.

The power supply unit 180 supplies power necessary for operations of elements by receiving internal and external power under the control of the control unit 190.

The control unit 190 controls the overall operation of the mobile terminal 100. That is, the control unit 190 may generally control the communication unit 110, the user input unit 120, the obtaining unit 130, the output unit 140, the operation mode determining unit 150, the storage unit 160, the interface unit 170, and the power supply unit 180.

The control unit 190 may convert the signal for selecting the object according to a control protocol of the display device 200. That is, the control unit 190 may move a selection region or generate a control signal for selecting the object in the control protocol recognizable by the display device 200 according to a type of the display device 200.

The control unit 190 according to an exemplary embodiment may control the additional information or the contents displayed on the mobile terminal 100. For example, the control unit 190 may control a display (a displayed region, a displayed size, etc.) of the additional information, playing, pausing, changing to previous or next additional information, etc.

The control unit 190 may generate a first control signal for controlling the display device 200 or may selectively generate a second control signal for controlling the contents displayed on the mobile terminal 100 according to the operation mode of the mobile terminal 100. According to an exemplary embodiment, the first control signal may include a signal for controlling a movement of a selection region for selecting the object of the display device 200, and the second control signal may include a signal for controlling at least one of the playing of the contents, editing, and transmission.

The control unit 190 may change the operation mode of the mobile terminal 100 based on a rotation motion of the mobile terminal 100. For example, the control unit 190 may change the operation mode of the mobile terminal 100 from the first mode to the second mode based on a first rotation motion input and from the second mode to the first mode based on a second rotation motion input.

Various embodiments described herein may be implemented in a computer-readable recording medium by using, for example, software, hardware, or a combination thereof.

The embodiments described herein may be implemented in hardware by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing a function. In some cases, such embodiments may be implemented by the control unit 190.

The embodiments regarding procedures or functions may be implemented in software with a separate software module that enables at least one function or operation. Software codes may be implemented by a software application in an appropriate program language. Software codes may be stored in the storage unit 160 and may be executed by the control unit 190.

Figure 15:
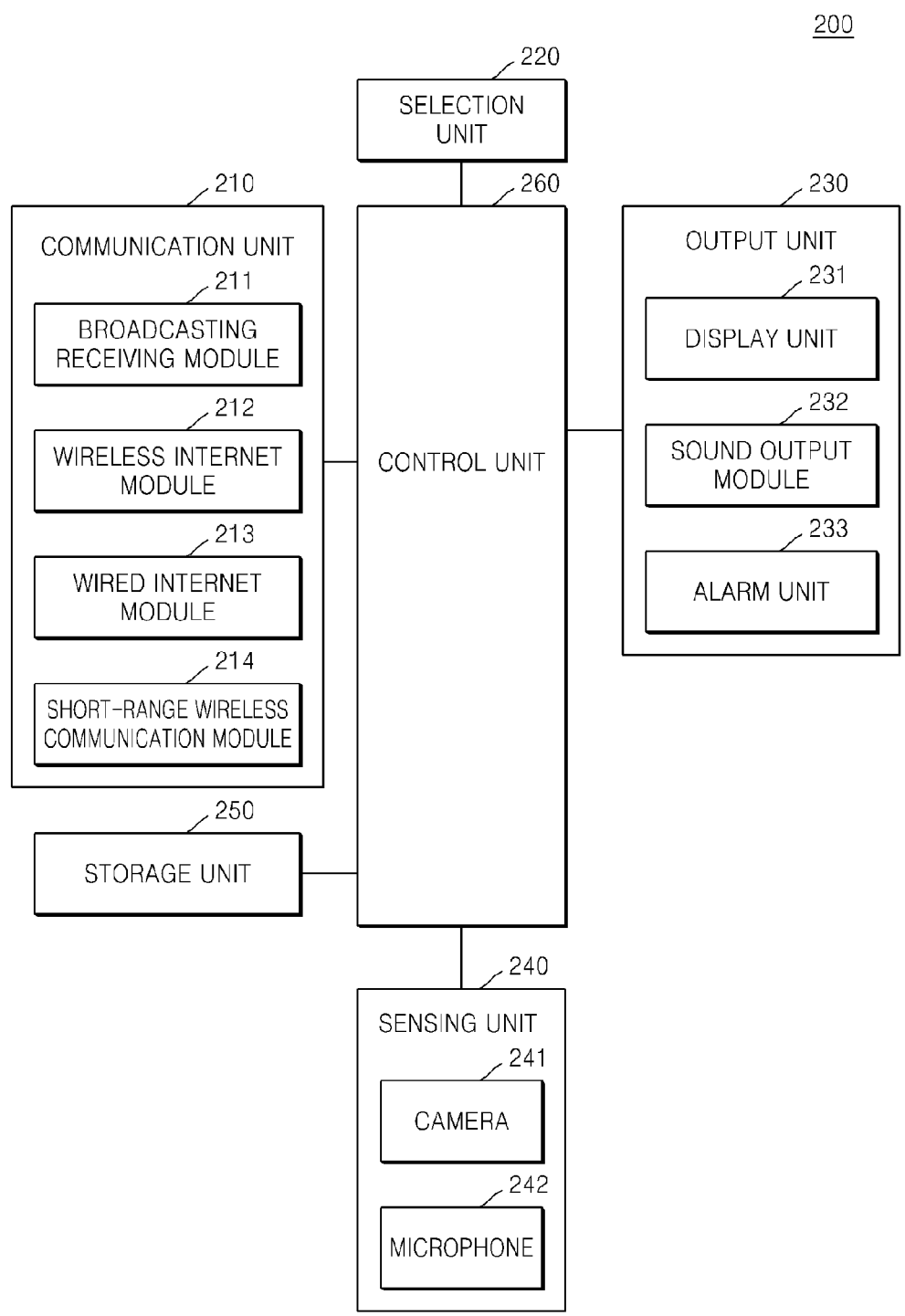
FIG. 15 is a block diagram of a display device, according to an exemplary embodiment.

FIG. 15 is a block diagram of the display device 200, according to an exemplary embodiment.

Referring to FIG. 15, the display device 200 according to an exemplary embodiment may include a communication unit 210, a selection unit 220, an output unit 230, a sensing unit 240, a storage unit 250, and a control unit 260. However, these elements may not all be essential. The display device 200 may be implemented with more or less elements than the elements of FIG. 15.

The above elements will now be sequentially described below.

The communication unit 210 may include one or more elements for communication between the mobile terminal 100 and the display device 200 or between networks in which the mobile terminal 100 and the display device 200 are disposed. For example, the communication unit 210 may include a broadcasting receiving module 211, a wireless Internet module 212, a wired Internet module 213, and a short-range wireless communication module 214.

The broadcasting receiving module 211 may receive a broadcasting signal and/or broadcasting information from an external broadcasting management server over a broadcasting channel. The broadcasting channel may include a satellite channel and a terrestrial wave channel.

The wireless Internet module 212 is a module for wireless Internet access, and may be included in or excluded from the display device 200.

The short-range wireless communication module 214 is a module for short-range wireless communication. A short-range wireless communication technology may include Wi- Fi, Bluetooth, Zigbee, WFD, UWB, IrDA, etc. but an exemplary embodiment is not limited thereto.

The communication unit 210 according to an exemplary embodiment may request control authorization from the mobile terminal 100 and receive a control authorization acceptance/ignore message to the mobile terminal 100 in response to the request.

The communication unit 210 may transmit additional information or contents corresponding to an object displayed on the display device 200 to the mobile terminal 100. In this regard, the communication unit 210 may transmit additional information or contents previously stored in the storage unit 250 to the mobile terminal 100 or search for the additional information or contents in the server 300 and provide the additional information or contents to the mobile terminal 100. The communication unit 210 may also transmit link information (for example, a URL) of the additional information and link information (for example, a URL) of the contents to the mobile terminal 100.

The selection unit 220 may select the object displayed on the display device 200 based on a first input of the mobile terminal 100. For example, the selection unit 220 may receive a control signal for controlling a movement of a selection region for selecting the object from the mobile terminal 100 based on the first input of the mobile terminal 100. The selection unit 200 may select the object by moving the selection region according to the received control signal.

The output unit 230 is used to output an audio signal, a video signal, or an alarm signal, and may include a display unit 231, a sound output module 232, and an alarm unit 233. The display unit 231 displays information processed by the display device 200. For example, the display device 200 may display an object list. The object list may include an image indicating contents, an icon, a title, etc. The object list may be displayed in a GUI form.

According to an exemplary embodiment, the display unit 231 may display an indication for selecting the object based on the first input of the mobile terminal 100 on a screen. For example, the display unit 231 may indicate a border of an object in which the selection region is shown as a box, increase a size of the object compared to other objects, or make the object blink on and off.

The sound output module 232 outputs audio data received through the communication unit 210 or stored in the storage unit 250. The sound output module 232 may include a speaker, a buzzer, etc.

The alarm unit 233 outputs a signal for notifying an occurrence of an event of the display device 200. An example of the event that occurs in the display device 200 may include power on/off, message reception, complete reception of broadcasting contents, object selection, etc.

The sensing unit 240 may sense a user input of the mobile terminal 100. For example, the sensing unit 240 may sense at least one of the first input of the mobile terminal 100 for selecting the object displayed on the display device 200 and a second input for obtaining additional information of the selected object.

The sensing unit 240 according to an exemplary embodiment may include a camera 241 and a microphone 242. The camera 241 according to an exemplary embodiment 241 may include a depth camera, a multi-view camera, etc. The depth camera measures distances between objects in a scene in real time by using a time-of-flight (TOF) technology. The measured distance values may be output as depth images and used to manufacture a high quality depth map of the scene, along with a binocular camera or the multi-view camera.

In a case where the user input of the mobile terminal 100 is a motion input or a bending input, the sensing unit 240 may sense a movement of the mobile terminal 100 or a bending motion thereof through the camera 241.

In a case where the user input of the mobile terminal 100 is a voice input, the sensing unit 240 may recognize or analyze a user's voice through the microphone 242.

The storage unit 250 may store a program for processing or controlling the control unit 260. The storage unit 250 may perform a function of storing input and output data. For example, the input and output data may include contents (for example, a still image, a moving image, music, a document, an application, link information, etc.) obtained from the server 300.

The storage unit 250 may include at least one storage medium selected from the group consisting of flash memory, hard disk type memory, multimedia card micro type memory, card type memory (for example, SD memory, XD memory, or the like), RAM, SRAM, ROM, EEPROM, PROM, magnetic memory, a magnetic disk, and an optical disk. In addition, the display device 200 may operate as a web storage facilitator for performing a storing function on the Internet.

The control unit 260 controls the overall operation of the display device 200. That is, the control unit 260 may generally control the communication unit 210, the selection unit 220, the output unit 230, the sensing unit 240, and the storage unit 250.

The control unit 260 according to an exemplary embodiment may control a movement direction of the selection region for selecting the object, a moving speed of the selection region, and the number of objects displayed on the screen of the display device 200 based on the first input of the mobile terminal 100. For example, in a case where the user moves the mobile terminal up and down and left and right, the selection region on the display device 200 may be moved up and down left and right, and, in a case where the user moves the mobile terminal 100 fast, the selection region may be moved by several spaces. In a case where the user moves the mobile terminal 100 in a +Z axial direction, the number of objects displayed on the screen of the display device 200 may increase, and, in a case where the user moves the mobile terminal 100 in a −Z axial direction, the number of objects displayed on the screen of the display device 200 may decrease.

According to an exemplary embodiment, the control unit 260 may convert the first input received from the mobile terminal 100 to the control signal for controlling the movement of the selection region according to a control protocol of the display device 200. For example, the control unit 260 may generate the control signal for moving the selection region by one space every time a predetermined gyro sensor value (for example, 10 deg/sec) greater than a threshold value is received from the mobile terminal 100.

According to an exemplary embodiment, the control unit 260 may extract additional information from the contents corresponding to the selected object.

Figure 16:
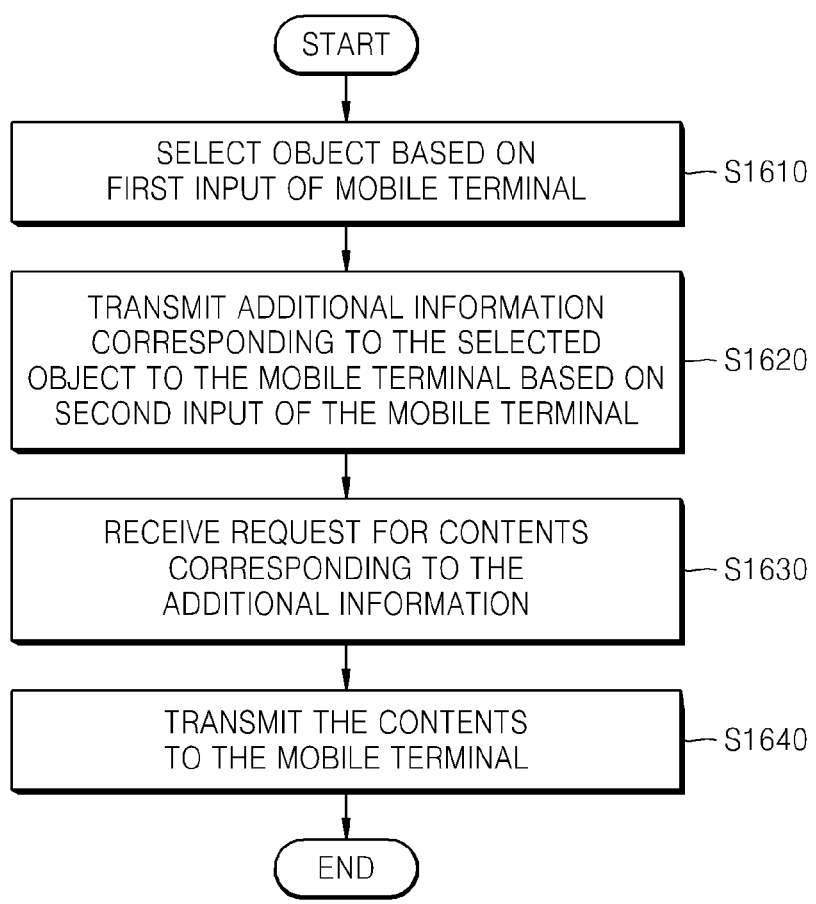
FIG. 16 is a flowchart illustrating a method in which a display device provides information, according to an exemplary embodiment.

FIG. 16 is a flowchart illustrating a method in which the display device 200 provides information, according to an exemplary embodiment. Referring to FIG. 16, the method in which the display device 200 provides information according to an exemplary embodiment includes operations sequentially performed by the display device 200 of FIG. 15. Thus, although omitted below, the above descriptions regarding the display device 200 of FIG. 15 may also apply to the method in which the display device 200 provides information of FIG. 16.

In operation S1610, the display device 200 may receive a first input of the mobile terminal 100 and select at least one object displayed on a screen. The first input of the mobile terminal 100 according to an exemplary embodiment may include at least one of a motion input, a key input, a touch input, a bending input, and a voice input. For example, a user may select at least one object displayed on the screen of the display device 200 through a 3D motion input for moving the mobile terminal 100 in 3D directions of X, Y, and Z axes.

According to an exemplary embodiment, the display device 200 may receive a signal that is generated by the mobile terminal 100 based on the first input of the mobile terminal 100 and controls a movement of a selection region from the mobile terminal 100. That is, the signal for controlling the movement of the selection region according to an exemplary embodiment may be a signal converted to a control protocol of the display device 200 in the mobile terminal 100. The display device 200 may move the selection region according to the control signal received from the mobile terminal 100 and select an object.

According to another exemplary embodiment, the display device 200 may convert the received first input to the control signal for controlling the movement of the selection region based on the control protocol of the display device 200. That is, in a case where a signal that is not converted to the control protocol of the display device 200 is received from the mobile terminal 100, the display device 200 may convert the received signal to the control protocol thereof.

According to an exemplary embodiment, the display device 200 may receive the control signal for controlling the movement of the selection region from each of a plurality of mobile terminals.

According to an exemplary embodiment, the display device 200 may sense the first input of the mobile terminal 100 through the camera 241. In this regard, the display device 200 may directly generate a control command for controlling the movement of the selection region and a control command for selecting the object based on the sensed first input of the mobile terminal 100. According to another exemplary embodiment, the display device 200 may authenticate a signal for selecting the object received from the mobile terminal 100 by sensing the first input of the mobile terminal 100.

According to an exemplary embodiment, the display device 200 may control at least one of a movement direction of the selection region for selecting the object, a movement speed of the selection region, and the number of objects displayed on the screen based on the first input of the mobile terminal 100.

For example, in a case where the mobile terminal 100 is moved in a left direction, a left region of the mobile terminal 100 is bent, a finger or an electronic pen is dragged in the left direction on a touch screen of the mobile terminal 100, a left direction key is pressed, or a voice saying "left movement" is input, the display device 200 may move the selection region to the left.

The display device 200 may increase or decrease the movement speed of the selection region based on the movement speed of the mobile terminal 100, a bending frequency of the mobile terminal 10, a movement speed of a touch gesture, etc. That is, the display device 200 may move the selection region by one space or several spaces.

According to an exemplary embodiment, in a case where the mobile terminal 100 is moved in a +Z axial direction, the display device 200 may increase the number of objects displayed on the screen, and, in a case where the mobile terminal 100 is moved in a −Z axial direction, the display device 200 may decrease the number of objects displayed on the screen.

The display device 200 may transmit thumbnail information of contents corresponding to the object to the mobile terminal 100. For example, the display device 200 may transmit an icon of the contents corresponding to an object in which the selection region is disposed, an image, a title, a type, identification information, etc. to the mobile terminal 100 while selecting the object.

In operation S1620, the display device 200 may transmit additional information corresponding to the selected object to the mobile terminal 100 based on a second input of the mobile terminal 100. The second input of the mobile terminal 100 according to an exemplary embodiment may be an input for requesting the additional information corresponding to the selected object.

The second input of the mobile terminal 100 according to an exemplary embodiment may include at least one of a motion input, a bending input, a key input, a voice input, and a touch input. For example, the second input of the mobile terminal 100 may be a rotational motion input for rotating the mobile terminal 100 by more than a predetermined angle.

According to an exemplary embodiment, the display device 200 may sense the second input of the mobile terminal 100. In this case, the display device 200 may transmit the additional information to the mobile terminal 100 based on the second input even though an additional information request is not received from the mobile terminal 100.

According to an exemplary embodiment, the display device 200 may transmit additional information stored in the storage unit 250 or extract additional information from the contents corresponding to the selected object and transmit the extracted additional information to the mobile terminal 100. The display device 200 may receive additional information from the server 300 based on link information of the additional information and transmit the received additional information to the mobile terminal 100.

The additional information according to an exemplary embodiment may include preview information, prelistening information, application information, user review information, update information, newspaper article information, goods information, movie information, game information, advertisement image information, and album information.

In operation S1630, the display device 200 may receive a request for a transmission of contents corresponding to the additional information displayed on the screen of the mobile terminal 100 from the mobile terminal 100. That is, in a case where a user likes additional information of contents, the user may download the corresponding contents.

In operation S1640, the display device 200 may transmit the contents to the mobile terminal 100. In this regard, according to an exemplary embodiment, the display device 200 may transmit contents stored in the storage unit 250 to the mobile terminal 100 or receive contents from the server and transmit the received contents to the mobile terminal 100. The display device 200 may transmit link information from which contents may be downloaded to the mobile terminal 100.

Figure 17:
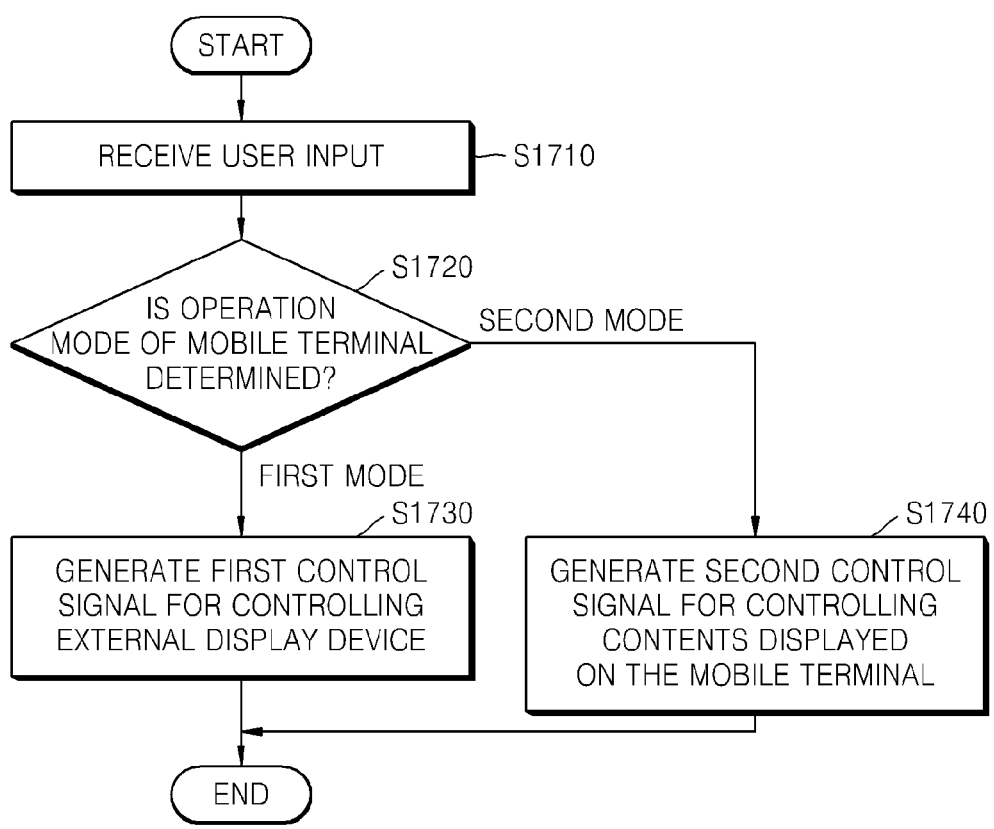
FIG. 17 is a flowchart illustrating a method in which a mobile terminal generates a control signal, according to an exemplary embodiment.

FIG. 17 is a flowchart illustrating a method in which the mobile terminal 100 generates a control signal, according to an exemplary embodiment. Referring to FIG. 17, the method in which the mobile terminal 100 generates the control signal according to an exemplary embodiment includes operations sequentially performed by the mobile terminal 100 of FIG. 14. Thus, although omitted below, the above descriptions regarding the mobile terminal 100 of FIG. 14 will also apply to the method in which the mobile terminal 100 generates the control signal of FIG. 17.

In operation S1710, the mobile terminal 100 may receive a user input. The user input according to an exemplary embodiment may include at least one of a motion input, a key input, a touch input, a bending input, and a voice input.

In operation S1720, the mobile terminal 100 may determine an operation mode thereof. The operation mode according to an exemplary embodiment may include a mode in which the display device 200 is controlled (a first mode) and a mode in which the mobile terminal 100 is controlled (a second mode). For example, the operation mode may include a mode in which an object of the display device 200 is selected, a mode in which additional information corresponding to the selected object is displayed on the mobile terminal 100, a mode in which contents corresponding to the additional information is displayed on the mobile terminal 100, etc.

According to an exemplary embodiment, the mobile terminal 100 may determine the operation mode as the first mode (for example, the object selection mode) in a case where the mobile terminal 100 is a vertical mode, and may determine the operation mode as a second mode (for example, the additional information display mode) in a case where the mobile terminal 100 is in a horizontal mode.

According to another exemplary embodiment, the mobile terminal 100 may determine the operation mode of the mobile terminal 100 based on information displayed on a screen of the mobile terminal 100. For example, in a case where the information displayed on the screen of the mobile terminal 100 is thumbnail information of contents corresponding to an object displayed on the display device 200 or movement direction information of the mobile terminal 100, the mobile terminal 100 may determine the operation mode thereof as the first mode, and, in a case where the information displayed on the screen of the mobile terminal 100 is the contents corresponding to the object displayed on the display device 200 or additional information corresponding to the object, the mobile terminal 100 may determine the operation mode thereof as the second mode.

In operation S1730, in a case where the operation mode of the mobile terminal 100 is the first mode, the mobile terminal 100 may generate a first control signal for controlling the external display device 200 based on the user input of the mobile terminal 100.

The first mode according to an exemplary embodiment may be a mode in which the object of the display device 200 is selected. The first control signal according to an exemplary embodiment may include a signal for controlling a movement of a selection region for selecting the object of the display device 200. That is, if the user input is received in the first mode, the mobile terminal 100 may convert the received user input to the signal for controlling the movement of the selection region for selecting the object.

For example, in the first mode, in a case where a motion input for moving the mobile terminal 100 in an upper direction (+Y direction) is received or a touch input for dragging a touch screen in the upper direction is received, the mobile terminal 100 may generate a control signal for moving the selection region for selecting the object by one space upward.

According to an exemplary embodiment, the mobile terminal 100 may convert the first control signal to a control protocol of the display device 200.

In operation S1740, in a case where the operation mode of the mobile terminal 100 is the second mode, the mobile terminal 100 may generate a second control signal for controlling the contents displayed on the mobile terminal 100 based on the user input.

The second mode according to an exemplary embodiment may be a mode in which the additional information corresponding to the selected object is displayed on the mobile terminal 100. The second control signal according to an exemplary embodiment may include a signal for controlling at least one of a playing/pausing of the contents, editing (move, store, copy, delete, etc.), and a transmission. That is, if the user input is received in the second mode, the mobile terminal 100 may convert the received user input to a control signal for controlling the contents.

For example, in the second mode, in a case where a motion input for moving the mobile terminal 100 in the upper direction (+Y direction) is received or a touch input for dragging the touch screen in the upper direction is received, the mobile terminal 100 may generate a control signal for stopping playing of the contents.

The contents controlled in the second mode according to an exemplary embodiment may include the contents corresponding to the object selected by the display device 200 based on the first control signal and the additional information corresponding to the object.

The contents according to an exemplary embodiment may include at least one of a still image, a moving image, an application, music, a webpage, and an EPG. The additional information according to an exemplary embodiment may include at least one of preview information, prelistening information, application information, user review information, update information, newspaper article information, goods information, movie information, game information, advertisement image information, and album information.

According to an exemplary embodiment, the mobile terminal 100 may receive a first rotational motion input for rotating the mobile terminal 100 in a first direction by a predetermined angle (for example, ±90 degrees). In this case, the mobile terminal 100 may convert the operation mode from a first mode to a second mode based on the first rotational motion input.

In a case where a second rotational motion input for rotating the mobile terminal 100 in a second direction by a predetermined angle (for example, −90 degrees) is received, the mobile terminal 100 may convert the operation mode from the second mode to the first mode based on the second rotational motion input.

For example, in a case where a user rotates the mobile terminal 100 in a vertical mode by 90 degrees in a clockwise direction and changes the vertical mode to a horizontal mode, the operation mode of the mobile terminal 100 may be changed from the object selection mode to the additional information display mode. To the contrary, in a case where a user rotates the mobile terminal 100 in the horizontal mode by 90 degrees in a counterclockwise direction and changes the horizontal mode to the vertical mode, the operation mode of the mobile terminal 100 may be changed from the additional information display mode to the object selection mode.

According to another exemplary embodiment, the mobile terminal 100 may display a GUI (for example, an icon) for converting the (operation?) mode on the screen. In this regard, in a case where the user selects (or touches) a mode conversion icon, the mobile terminal 10 may convert the operation mode from the first mode to the second mode or from the second mode to the first mode.

The method may be performed by program commands that may be executed in a computer and can be recorded on a computer-readable recording medium. Examples of the computer-readable recording medium can include program commands, data files, data structures, and the like in a single or combination form. The program commands recorded on the computer-readable recording medium may be particularly designed and configured for tan exemplary embodiment. Examples of the computer-readable recording mediums include hardware devices that are particularly configured to store and execute program commands, such as hard disks, floppy disks, magnetic media, such as magnetic tapes, optical media, such as CD-ROMs or DVDs, magneto-optical media, such as floptical disks, read-only memory (ROM), random-access memory (RAM), flash memory, etc. Examples of the program commands include advanced language codes that may be executed in a computer by using an interpreter, as well as mechanical language codes that are made by a compiler.

According to an exemplary embodiment, the user may easily search for and select an object from a display device (for example, a TV set) that is inconvenient in terms of a user input by using the mobile terminal 100, and may confirm additional information regarding contents selected through the mobile terminal 100 in advance.

According to an exemplary embodiment, if the user confirms a preview on a screen of the mobile terminal 100 through a movement of the mobile terminal 100 and selects downloading of contents, even if the user carries the mobile terminal 100 and goes out, the contents may be seamlessly downloaded.

While exemplary embodiments have been particularly shown and described with reference to the drawings, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description but by the appended claims, and all differences within the scope will be construed as being included in the inventive concept.

What is claimed is:

1. A mobile device comprising:
 a memory storing instructions; and
 a processor configured to execute the stored instructions to control the mobile device to perform:
 transmitting, to an external display device, a signal for selecting an object from among a plurality of objects displayed on the external display device based on a first input of a user through the mobile device;
 requesting, to the external display device, additional information corresponding to the object based on a second input of the user through the mobile device;
 receiving, from the external display device, the additional information corresponding to the object;
 displaying a plurality pieces of information related to the object based on the additional information received from the external display device, the additional information including the plurality pieces of information related to the object;
 requesting a content corresponding to a piece of information from among the plurality pieces of information related to the object; and
 receiving the content corresponding to the piece of information.

2. The mobile device of claim 1, wherein the processor is further configured to convert the signal for selecting the object according to a control protocol of the external display device.

3. The mobile device of claim 1, wherein the processor is further configured to control the mobile device to transmit a signal for controlling a movement of a selection region for selecting the object displayed on the external display device.

4. The mobile device of claim 3, wherein the processor is further configured to control the mobile device to transmit a signal for controlling at least one from among a movement direction of the selection region, a movement speed of the selection region, and the number of objects displayed on a screen of the external display device based on the first input.

5. The mobile device of claim 3, wherein the processor is further configured to control the mobile device to display thumbnail information corresponding of the object in which the selection region is disposed prior to the requesting of the additional information.

6. The mobile device of claim 1, wherein the processor is further configured to control the mobile device to receive link information of the additional information from the external display device based on the second input and
 receive the content from a server based on the received link information.

7. The mobile device of claim 1, wherein the processor is further configured to control the mobile device to request the content based on a third input of the user through the mobile device.

8. The mobile device of claim 1, wherein the processor is further configured to control the mobile device to request control authorization from the external display device and receive a control authorization acceptance message from the external display device prior to the transmitting of the signal for selecting the object.

9. The mobile device of claim 1, wherein the plurality of objects comprise at least one from among an icon, a link, a picture, a text, and an index item.

10. The mobile device of claim 1, wherein the content comprise at least one from among a still image, a moving image, an application, music, a web page, and an electronic program guide (EPG).

11. The mobile device of claim 1, wherein the additional information comprises at least one from among preview information, prelistening information, application information, user review information, update information, newspaper article information, goods information, movie information, game information, advertisement image information, and album information.

12. The mobile device of claim 1, wherein the processor is further configured to control the mobile device to
 determine an operation mode of the mobile device; and
 in response to determining the operation mode is a first mode, generate a first signal for controlling the external display device based on a user input, and, in response to determining the operation mode is a second mode, generate a signal for controlling the content displayed on the mobile device based on the user input.

13. A method in which a mobile device displays information, the method comprising:
 transmitting, to an external display device, a signal for selecting an object from among a plurality of objects displayed on the external display device based on a first input of a user through the mobile device;
 requesting, to the external display device, additional information corresponding to the object based on a second input of the user through the mobile device;

receiving, from the external display device, the additional information corresponding to the object;

displaying a plurality pieces of information related to the object based on the additional information received from the external display device, the additional information including the plurality pieces of information related to the object;

requesting a content corresponding to a piece of information from among the plurality pieces of information related to the object; and receiving the content corresponding to the piece of information.

14. The method of claim 13, wherein the transmitting the signal for selecting the object comprises transmitting a signal for controlling a movement of a selection region for selecting the object displayed on the external display device.

15. The method of claim 14, wherein the transmitting the signal for controlling the movement of the selection region comprises transmitting a signal for controlling at least one from among a movement direction of the selection region, a movement speed of the selection region, and the number of objects displayed on a screen of the external display device based on the first input.

16. The method of claim 14, further comprising displaying thumbnail information corresponding of the object in which the selection region is disposed prior to the requesting of the additional information.

17. The method of claim 13, wherein the receiving the additional information comprises receiving link information of the additional information from the external display device based on the second input and, wherein the receiving the content comprises receiving the content from a server based on the received link information.

18. The method of claim 13, wherein the content comprise at least one from among a still image, a moving image, an application, music, a web page, and an electronic program guide (EPG).

19. The method of claim 13, further comprising:

determining an operation mode of the mobile device; and in response to determining the operation mode is a first mode, generating a first signal for controlling the external display device based on a user input, and, in response to determining the operation mode is a second mode, generating a signal for controlling the content displayed on the mobile device based on the user input.

20. A non-transitory computer-readable recording medium having recorded thereon a program for executing the method of claim 13.

* * * * *